(12) United States Patent
Roques et al.

(10) Patent No.: US 11,801,835 B2
(45) Date of Patent: Oct. 31, 2023

(54) CONTROLLER FOR A VEHICLE BASED ON ACCELERATOR PEDAL POSITION

(71) Applicant: JAGUAR LAND ROVER LIMITED, Coventry (GB)

(72) Inventors: Olivier Roques, Warwickshire (GB); Pierre-Gwenael Meslot, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 169 days.

(21) Appl. No.: 16/971,423

(22) PCT Filed: Feb. 18, 2019

(86) PCT No.: PCT/EP2019/053946
§ 371 (c)(1),
(2) Date: Aug. 20, 2020

(87) PCT Pub. No.: WO2019/162225
PCT Pub. Date: Aug. 29, 2019

(65) Prior Publication Data
US 2021/0031764 A1     Feb. 4, 2021

(30) Foreign Application Priority Data

Feb. 26, 2018   (GB) .................................. 1803015
Feb. 26, 2018   (GB) .................................. 1803016
Feb. 26, 2018   (GB) .................................. 1803017

(51) Int. Cl.
*B60W 30/14*      (2006.01)
*B60W 40/06*      (2012.01)
(Continued)

(52) U.S. Cl.
CPC .......... *B60W 30/143* (2013.01); *B60W 40/06* (2013.01); *B60W 50/10* (2013.01);
(Continued)

(58) Field of Classification Search
None
See application file for complete search history.

(56) References Cited

U.S. PATENT DOCUMENTS 6,078,860 A * 6/2000 Kerns ................... F02D 11/106
                                                123/399
7,739,005 B1   6/2010 Tang
(Continued)

FOREIGN PATENT DOCUMENTS

DE     102014009856 A1    1/2016
EP         1621438 A2     2/2006
(Continued)

OTHER PUBLICATIONS

International Search Report and Written Opinion, PCT/EP2019/053946, dated May 15, 2019.
(Continued)

*Primary Examiner* — James J Lee
*Assistant Examiner* — Tawri M McAndrews
(74) *Attorney, Agent, or Firm* — McCoy Russell LLP

(57) ABSTRACT

A controller for a vehicle is configured to determine the position of the accelerator pedal with respect to a reference accelerator pedal position ($a_{ref}$); and either determine a torque output in dependence on an acceleration pedal map if the position of the accelerator pedal is greater than the reference accelerator pedal position ($a_{ref}$); and, determine a torque output in dependence on a deceleration pedal map if the position of the accelerator pedal is less than the reference accelerator pedal position ($a_{ref}$).

12 Claims, 24 Drawing Sheets

(51) Int. Cl.
   *B60W 50/10*   (2012.01)
   *B60W 50/00*   (2006.01)
(52) U.S. Cl.
   CPC ............ *B60W 2050/0026* (2013.01); *B60W 2510/244* (2013.01); *B60W 2520/10* (2013.01); *B60W 2540/10* (2013.01); *B60W 2552/00* (2020.02); *B60W 2552/15* (2020.02)

(56) References Cited

U.S. PATENT DOCUMENTS

| | | | |
|---|---|---|---|
| 2003/0055551 A1* | 3/2003 | Weber | F02D 11/105 180/170 |
| 2005/0171669 A1* | 8/2005 | Sato | B60W 30/188 701/51 |
| 2009/0112386 A1* | 4/2009 | Saitoh | B60L 58/40 701/22 |
| 2010/0198449 A1 | 8/2010 | Ueoka et al. | |
| 2014/0021898 A1 | 1/2014 | Hendrickson et al. | |
| 2015/0217767 A1* | 8/2015 | Kelly | B60W 10/04 701/93 |
| 2016/0059703 A1 | 3/2016 | Miller et al. | |
| 2016/0121891 A1* | 5/2016 | Kim | B60W 30/18 701/96 |
| 2016/0257197 A1* | 9/2016 | Fader | F16H 61/16 |
| 2016/0375893 A1* | 12/2016 | Nefcy | B60W 30/18127 180/65.265 |
| 2020/0164885 A1* | 5/2020 | Kujubu | H02P 3/14 |
| 2021/0039624 A1* | 2/2021 | Umetsu | B60W 10/196 |

FOREIGN PATENT DOCUMENTS

| | | | | |
|---|---|---|---|---|
| EP | 2546496 | A1 | 1/2013 | |
| EP | 2604461 | A1 | 6/2013 | |
| EP | 3045363 | A1 | 7/2016 | |
| GB | 2529627 | A * | 3/2016 | ............... B60T 8/00 |
| JP | H05191904 | A | 7/1993 | |
| JP | 2004316550 | A | 11/2004 | |
| JP | 3632301 | B2 | 3/2005 | |
| WO | 2013160014 | A1 | 10/2013 | |
| WO | 2014084827 | A1 | 6/2014 | |

OTHER PUBLICATIONS

Combined Search and Examination Report, GB1803015.5, dated Aug. 30, 2018.
European Patent Office, Office Action Issued in Application No. 19707008.9, dated Dec. 16, 2022, Germany, 6 pages.

* cited by examiner

CONTROLLER FOR A VEHICLE BASED ON ACCELERATOR PEDAL POSITION

CROSS-REFERENCE TO RELATED APPLICATIONS

This application is a 371 of International Application No. PCT/EP2019/053946, filed Feb. 18, 2019, which claims priority to GB Patent Application 1803015.5, filed Feb. 26, 2018, and GB Patent Application 1803016.3, filed Feb. 26, 2018, and GB Patent Application 1803017.1, filed Feb. 26, 2018, the contents of each of which are incorporated by reference herein in their entirety.

TECHNICAL FIELD

The present disclosure relates to a controller for a vehicle. Aspects of the invention relate to a controller, a control system, a vehicle and to a method.

BACKGROUND

A conventional powertrain for a vehicle delivers a given amount of resistive torque due to the internal losses of an internal combustion engine (ICE) when the accelerator pedal is released. The level of restive torque or "overrun" provided by the ICE by can be increased by downshifting gears, which increases the frictional and pumping losses of the ICE. With electrification of the powertrain, it is now possible to offer a customisable level of resistive torque when the accelerator pedal is released by emulating the internal losses of an ICE to single-pedal driving. However, known emulations of these losses fail to reproduce accurately the experience that drivers expect from driving a vehicle comprising an ICE.

The present invention has been devised to mitigate or overcome the above-mentioned problem.

SUMMARY OF THE INVENTION

According to an aspect of the present invention there is provided a controller for a vehicle, the controller being configured to:
determine the position of the accelerator pedal with respect to a reference accelerator pedal position; and,
determine a torque output in dependence on an acceleration pedal map if the position of the accelerator pedal is greater than the reference accelerator pedal position; or,
determine a torque output in dependence on a deceleration pedal map if the position of the accelerator pedal is less than the reference accelerator pedal position.

The controller may be configured to:
receive a road load signal indicative of a torque value suitable for maintaining the current speed of the vehicle;
determine a road load accelerator pedal position signal in dependence on the road load signal, the road load accelerator pedal position signal being indicative of the reference accelerator pedal position;
receive an accelerator pedal position signal indicative of the current position of the accelerator pedal; and,
compare the reference accelerator pedal position signal and the accelerator pedal position signal to determine the position of the accelerator pedal with respect to the reference accelerator pedal position.

The controller may be configured to:
receive a maximum torque signal indicative of the maximum torque deliverable by the powertrain of the vehicle; and,
determine the acceleration pedal map in dependence on the road load signal and the maximum torque signal.

The controller may be configured to:
receive an overrun torque demand signal indicative of the level of overrun torque requested by a vehicle system; and,
determine the deceleration pedal map in dependence on the road load signal and the overrun toque demand signal.

Optionally, the road load signal is a function of at least one of:
the speed of the vehicle;
the gradient of the surface the vehicle is traversing;
the terrain response mode; and,
the torque requested from the powertrain of the vehicle.

Optionally, the maximum torque signal is a function of at least one of:
the speed of the vehicle;
the gradient of the surface the vehicle is traversing;
the terrain response mode; and,
the torque requested from the powertrain of the vehicle.

Optionally, the overrun torque demand signal is a function of at least one of:
the speed of the vehicle;
the gradient of the surface the vehicle is traversing;
the terrain response mode; and,
the torque requested from the powertrain of the vehicle.

In an embodiment, the acceleration pedal map comprises a low-speed acceleration pedal map and a high-speed acceleration pedal map.

In an embodiment, the deceleration pedal map comprises a low-speed deceleration pedal map and a high-speed deceleration pedal map.

The controller may be configured to:
receive a vehicle speed signal indicative of the speed of the vehicle; and,
determine a torque output according to the low-speed acceleration pedal map if the position of the accelerator pedal is greater than the reference accelerator pedal position and the vehicle speed equals or is less than a low-speed limit; or,
determine a torque output according to the high-speed acceleration pedal map if the position of the accelerator pedal is greater than the reference accelerator pedal position and the vehicle speed equals or is greater than a high-speed limit.

The controller may be configured to:
receive a vehicle speed signal indicative of the speed of the vehicle; and,
determine a torque output according to the low-speed deceleration pedal map if the position of the accelerator pedal is less than the reference accelerator pedal position and the vehicle speed equals or is less than a low-speed limit; or,
determine a torque output according to the high-speed deceleration pedal map if the position of the accelerator pedal is less than the reference accelerator pedal position and the vehicle speed equals or is greater than a high-speed limit.

The controller may be configured to determine a torque output in dependence on the low-speed acceleration pedal map and the high-speed acceleration pedal map if the position of the accelerator pedal is greater than the reference accelerator pedal position and the vehicle speed is between the low-speed limit and the high-speed limit.

The controller may be configured to determine a torque output in dependence on the low-speed deceleration pedal map and the high-speed deceleration pedal map if the position of the accelerator pedal is less than the reference accelerator pedal position and the vehicle speed is between the low-speed limit and the high-speed limit.

The controller may be configured to determine the torque output in dependence on the vehicle speed.

According to a further aspect of the present invention there is provided a control system for an accelerator pedal of a vehicle, the control system comprising a controller according to the previous aspect.

According to a further aspect of the present invention there is provided a vehicle comprising a control system according to the previous aspect.

According to a further aspect of the present invention, the controller may be configured to selectively inhibit or modify the application of acceleration or deceleration pedal maps in dependence on the surface over which the vehicle is travelling.

The controller may be configured to selectively inhibit or modify the application of acceleration or deceleration pedal maps in dependence on a received or determined terrain mode, or a terrain type received from a further vehicle system or controller.

According to a further aspect of the invention is provided a method of controlling a vehicle, the method comprising: determining the position of the accelerator pedal with respect to a reference accelerator pedal position; and determining a torque output in dependence on an acceleration pedal map if the position of the accelerator pedal is greater than the reference accelerator pedal position; or determining a torque output in dependence on a deceleration pedal map if the position of the accelerator pedal is less than the reference accelerator pedal position.

According to an aspect of the present invention there is provided a controller for a vehicle, the controller being configured to:
  receive a gradient signal indicative of the gradient of a surface the vehicle is traversing; and,
  determine a torque output in dependence on a positive gradient pedal map if the gradient signal indicates that the surface has a positive gradient; or
  determine a torque output in dependence on a negative gradient pedal map if the gradient signal indicates that the surface has a negative gradient.

In an embodiment, the torque output from the positive gradient pedal map is less than the torque value required for maintaining the speed of the vehicle on the positive gradient for the same pedal position.

In an embodiment, the torque output from the negative gradient map is less than the torque value required for maintaining the speed of the vehicle on the negative gradient for the same pedal position.

The controller may be configured to:
  receive a maximum torque signal indicative of the maximum torque deliverable by the powertrain of the vehicle;
  receive an overrun torque signal indicative of the maximum overrun torque deliverable by a vehicle system; and,
  determine a road load pedal map in dependence on the maximum torque signal and the maximum overrun torque signal.

The controller may be configured to determine the positive gradient pedal map in dependence on the road load pedal map and the gradient signal.

The controller may be configured to determine the negative gradient pedal map in dependence on the road load pedal map and the gradient signal.

In an embodiment, the positive gradient pedal map is offset from the road load pedal map such that the maximum torque output according to the positive gradient pedal map is greater than the maximum torque deliverable by the powertrain of the vehicle.

In an embodiment, the negative gradient pedal map is offset from the road load pedal map such that the minimum torque output according to the negative gradient pedal map is less than maximum overrun torque deliverable by a vehicle system.

The controller may be configured to determine a gradient modifier and modify the torque output in dependence on the gradient modifier.

According to another aspect of the present invention there is provided a controller for a vehicle, the controller being configured to:
  receive a gradient signal indicative of the gradient of a surface the vehicle is traversing;
  determine a gradient modifier in dependence on the gradient signal;
  modify an acceleration pedal map and a deceleration pedal map in dependence on the gradient modifier;
  determine the position of the accelerator pedal with respect to a reference accelerator pedal position; and
  determine a torque output in dependence on the acceleration pedal map if the position of the accelerator pedal is greater than the reference accelerator pedal position; or,
  determine a torque output in dependence on the deceleration pedal map if the position of the accelerator pedal is less than the reference accelerator pedal position.

In an embodiment, the acceleration map and the deceleration map are modified so as to reduce the torque output with respect to the position of the pedal.

The controller may be configured to:
  receive a road load signal indicative of a torque value suitable for maintaining the current speed of the vehicle;
  receive a road load accelerator pedal position signal in dependence on the road load signal, the road load accelerator pedal position signal being indicative of the reference accelerator pedal position;
  receive an accelerator pedal position signal indicative of the current position of the accelerator pedal; and,
  compare the reference accelerator pedal position signal and the accelerator pedal position signal to determine the position of the accelerator pedal with respect to the reference accelerator pedal position.

The controller may be configured to:
  receive a maximum torque signal indicative of the maximum torque deliverable by the powertrain of the vehicle; and,
  determine the acceleration pedal map in dependence on the road load signal and the maximum torque signal.

The controller may be configured to:
  receive an overrun torque demand signal indicative of the level of overrun torque requested by a vehicle system; and,
  determine the deceleration pedal map in dependence on the road load signal and the overrun toque demand signal.

Optionally, the road load signal is a function of at least one of:
- the speed of the vehicle;
- the gradient of the surface the vehicle is traversing;
- the terrain response mode; and,
- the torque requested from the powertrain of the vehicle.

Optionally, the maximum torque signal is a function of at least one of:
- the speed of the vehicle;
- the gradient of the surface the vehicle is traversing;
- the terrain response mode; and,
- the torque requested from the powertrain of the vehicle.

Optionally, the overrun torque demand signal is a function of at least one of:
- the speed of the vehicle;
- the gradient of the surface the vehicle is traversing;
- the terrain response mode; and,
- the torque requested from the powertrain of the vehicle.

In an embodiment, the acceleration pedal map comprises a low-speed acceleration pedal map and a high-speed acceleration pedal map.

In an embodiment, the deceleration pedal map comprises a low-speed deceleration pedal map and a high-speed deceleration pedal map.

The controller may be configured to:
- receive a vehicle speed signal indicative of the speed of the vehicle; and,
- determine a torque output according to the low-speed acceleration pedal map if the position of the accelerator pedal is greater than the reference accelerator pedal position and the vehicle speed equals or is less than a low-speed limit; or,
- determine a torque output according to the high-speed acceleration pedal map if the position of the accelerator pedal is greater than the reference accelerator pedal position and the vehicle speed equals or is greater than a high-speed limit.

The controller may be configured to:
- receive a vehicle speed signal indicative of the speed of the vehicle; and,
- determine a torque output according to the low-speed deceleration pedal map if the position of the accelerator pedal is less than the reference accelerator pedal position and the vehicle speed equals or is less than a low-speed limit; or,
- determine a torque output according to the high-speed deceleration pedal map if the position of the accelerator pedal is less than the reference accelerator pedal position and the vehicle speed equals or is greater than a high-speed limit.

The controller may be configured to determine a torque output in dependence on the low-speed acceleration pedal map and the high-speed acceleration pedal map if the position of the accelerator pedal is greater than the reference accelerator pedal position and the vehicle speed is between the low-speed limit and the high-speed limit.

The controller may be configured to determine a torque output in dependence on the low-speed deceleration pedal map and the high-speed deceleration pedal map if the position of the accelerator pedal is less than the reference accelerator pedal position and the vehicle speed is between the low-speed limit and the high-speed limit.

The controller may be configured to determine the torque output in dependence on the vehicle speed.

The controller may be configured to inhibit the positive gradient pedal map and/or the negative gradient pedal map in dependence on a terrain mode of the vehicle.

In an embodiment, the terrain mode of the vehicle is a sand mode or a rock mode.

According to a further aspect of the present invention there is provided a control system for a vehicle, the control system comprising a controller according to the previous aspect.

According to a further aspect of the present invention there is provided a vehicle comprising a control system according to the previous aspect.

According to a further aspect of the present invention, the controller may be configured to selectively inhibit or modify the application of acceleration or deceleration pedal maps in dependence on the surface over which the vehicle is travelling.

The controller may be configured to selectively inhibit or modify the application of acceleration or deceleration pedal maps in dependence on a received or determined terrain mode, or a terrain type received from a further vehicle system or controller.

According to a further aspect of the invention is provided a method of controlling a vehicle, the method comprising: determining the position of the accelerator pedal with respect to a reference accelerator pedal position; and determining a torque output in dependence on an acceleration pedal map if the position of the accelerator pedal is greater than the reference accelerator pedal position; or determining a torque output in dependence on a deceleration pedal map if the position of the accelerator pedal is less than the reference accelerator pedal position.

According to a further aspect of the invention is provided a method of controlling a vehicle, the method comprising: receiving a gradient signal indicative of the gradient of a surface the vehicle is traversing; determining a gradient modifier in dependence on the gradient signal; modifying an acceleration pedal map and a deceleration pedal map in dependence on the gradient modifier; determining the position of the accelerator pedal with respect to a reference accelerator pedal position; and determining a torque output in dependence on the acceleration pedal map if the position of the accelerator pedal is greater than the reference accelerator pedal position; or determining a torque output in dependence on the deceleration pedal map if the position of the accelerator pedal is less than the reference accelerator pedal position.

According to an aspect of the present invention there is provided a controller for a vehicle, the controller being configured to:
- receive a state of charge signal indicative of the state of charge of an energy storage means of the vehicle;
- receive an accelerator pedal position signal indicative of the position of the accelerator pedal within a pedal position range;
- determine an accelerator pedal map in dependence on the state of charge signal; and,
- determine a torque output in dependence on the accelerator pedal map and the accelerator pedal position signal.

In an embodiment, the accelerator pedal map is configured such that the torque output increases with respect to the pedal position.

In an embodiment, the accelerator pedal map is configured such that the torque output is a linear function of the pedal positon.

In an embodiment, the accelerator pedal map is configured such that the torque output increases at a higher rate with respect to the accelerator pedal position over a first part of the pedal position range than a second part of the pedal position range.

The controller may be configured to receive a vehicle speed signal indicative of the speed of the vehicle and wherein the accelerator pedal map is configured such that the torque output increases at a higher rate with respect to the accelerator pedal positon when the speed of the vehicle is less than a predetermined speed limit than when the speed of the vehicle equals or is greater than the predetermined speed limit.

In an embodiment, the accelerator pedal map is configured such that the torque output increases at a higher rate with respect to the accelerator pedal position when the toque output value is less than a predetermined torque limit than when the torque output value equals or is greater than the predetermined torque limit.

In an embodiment, the accelerator pedal map is configured such that the torque output is less than the torque value required for maintaining the speed of the vehicle.

The controller may be configured to:
  receive a torque signal indicative of the current torque being delivered by the powertrain of the vehicle; and,
  determine the torque output value in dependence on the current torque.

In an embodiment, the accelerator pedal map is configured such that maximum torque output according to the accelerator pedal map is less than the maximum torque deliverable by the powertrain of the vehicle.

The controller may be configured to:
  receive a maximum torque signal indicative of the maximum torque deliverable by the powertrain of the vehicle; and,
  determine the accelerator pedal map in dependence on the maximum torque signal.

In an embodiment, the state of charge signal indicates that the state of charge of the energy storage means of the vehicle is below a predetermined threshold.

According to a further aspect of the present invention there is provided a control system for an accelerator pedal of a vehicle, the control system comprising a controller according to the previous aspect.

According to a further aspect of the present invention there is provided a vehicle comprising a control system according to the previous aspect.

According to a further aspect of the invention there is provided a method of controlling a vehicle, the method comprising: receiving a state of charge signal indicative of the state of charge of an energy storage means of the vehicle; receiving an accelerator pedal position signal indicative of the position of the accelerator pedal within a pedal position range; determining an accelerator pedal map in dependence on the state of charge signal; and, determining a torque output in dependence on the accelerator pedal map and the accelerator pedal position signal.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
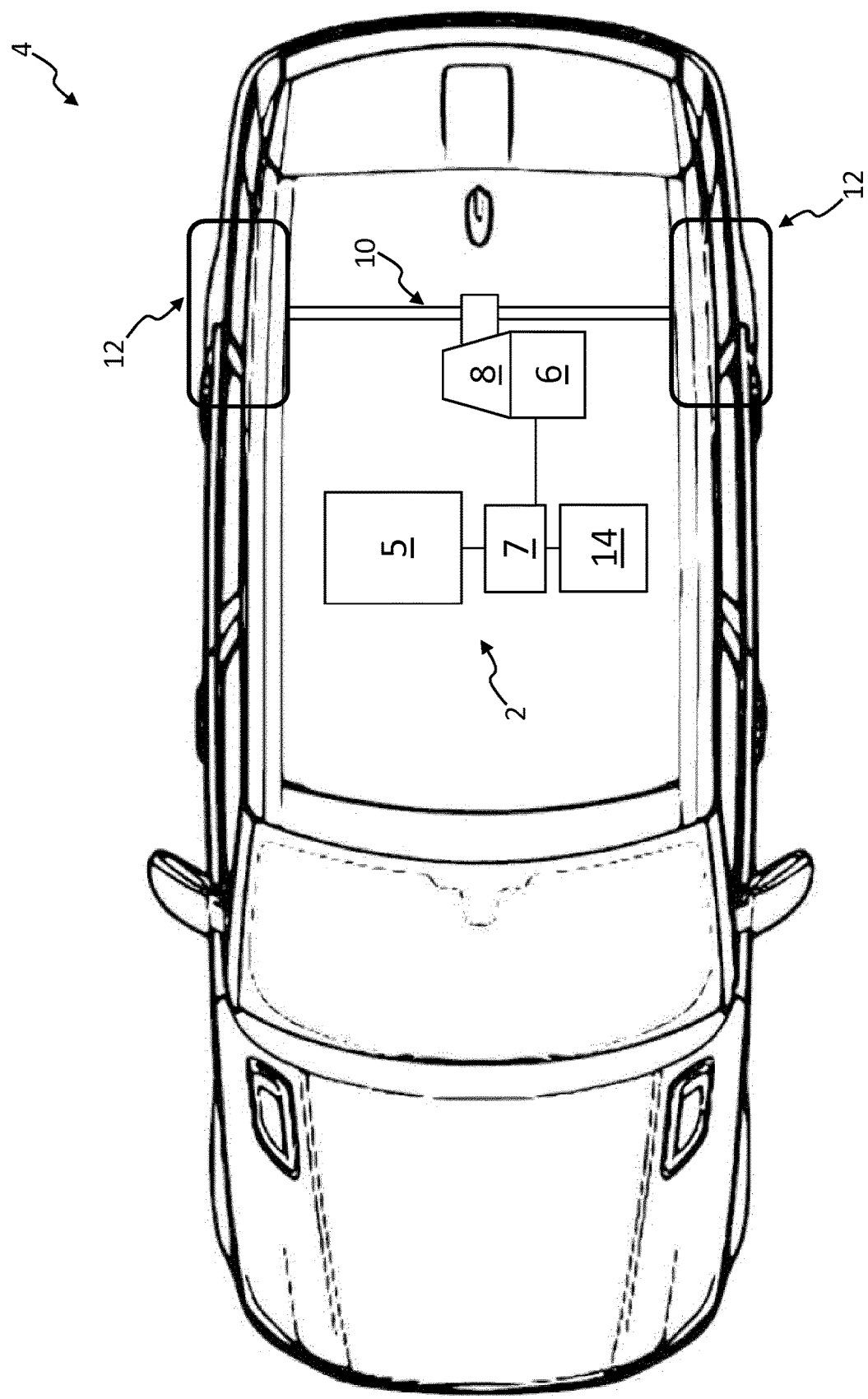
FIG. 1 shows a schematic representation of a powertrain for use with an embodiment of this invention.

With reference to FIG. 1, a powertrain, designated generally as 2, of an electric vehicle 4 is shown in plan view. The powertrain 2 comprises an energy storage means, in the form of a battery 5, operatively connected via an inverter 7 to an electric motor 6, which generates torque, and a drive transmission 8. The drive transmission 8 could take the form of a differential (no disconnection mechanism or gears). The torque is transferred through a driveline 10 to wheels 12 that generate a tractive force to move the vehicle 4. A controller 14 is operatively connected to the electric motor 6 by the inverter 7, and functions to control the generation of torque by converting an accelerator pedal position to a torque output using an accelerator pedal map. Although FIG. 1 only shows one motor 6 driving the wheels of a rear axle, it will apparent that the vehicle 4 may be arranged so that it has one motor driving the wheels of a front axle, or may have at least one additional motor to drive the wheels of both the front a and rear axles, or additional motors to drive individual wheels.

Figure 2:
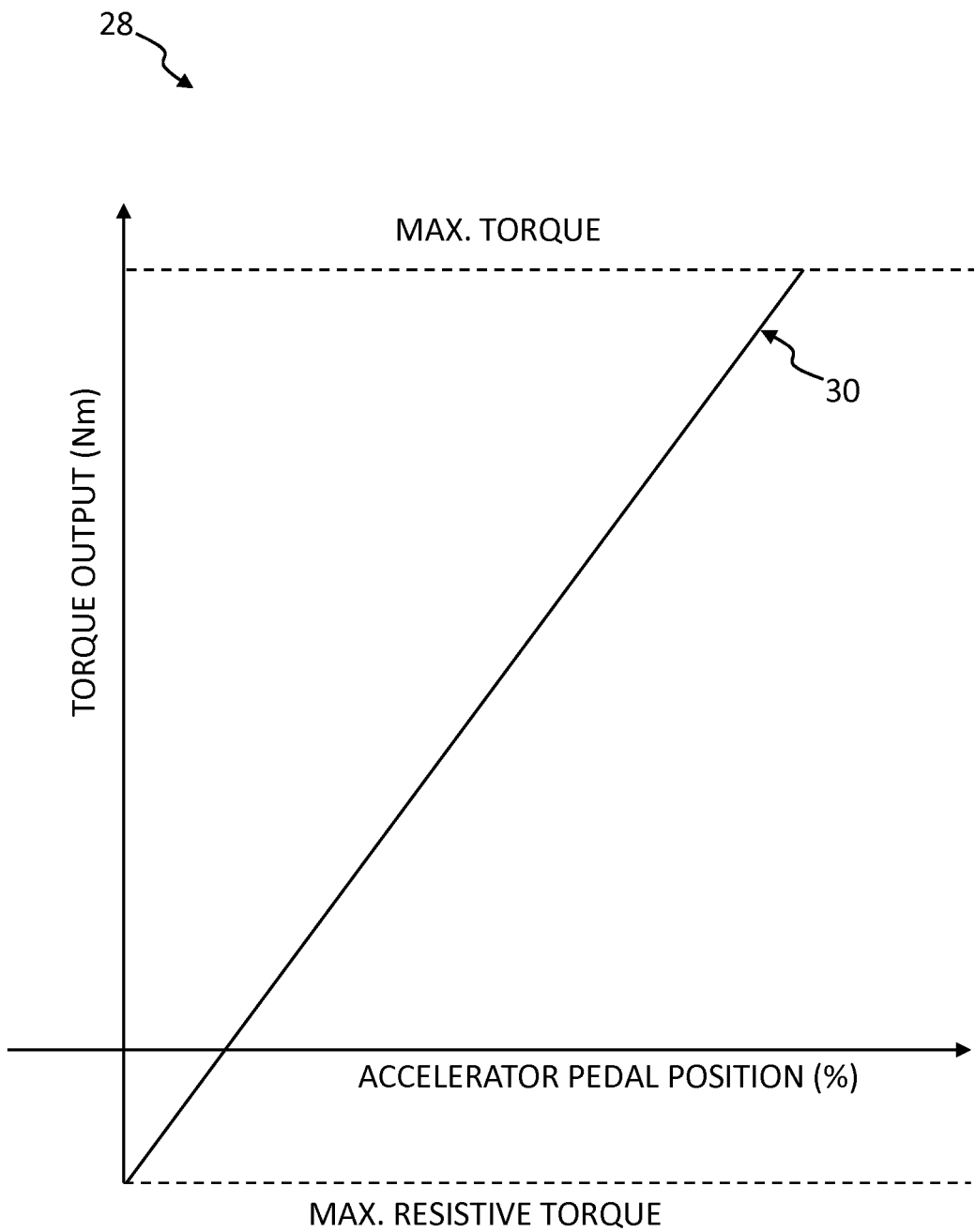
FIG. 2 shows a graph illustrating the torque output produced in response to an accelerator pedal position at road load conditions.

FIG. 2 shows a graph 28, in the form of an accelerator pedal map, relating the torque requested from the electric motor 6 to the travel of the accelerator pedal. The skilled reader will understand that this is a simplified section through a map that may also incorporates vehicle speed or actuator speed. A full map would consist of a torque surface in the Z (vertical) axis based on the accelerator pedal position in one axis and the motor speed or vehicle speed in another axis. The required torque is the output. Line 30 shows the road load plotted against the position of the accelerator pedal. For clarity, the term "road load" refers to the torque that opposes the movement of the vehicle 4 or, in other words, the torque necessary for maintaining the speed of the vehicle 4. Line 30 shows that the torque increases with respect to the accelerator pedal position to a maximum torque output relating to the maximum torque deliverable by the powertrain 2 when the accelerator pedal is fully pressed (100% accelerator pedal position). Conversely, the torque output decreases with respect to pedal position to a minimum when the accelerator pedal is fully released (0% accelerator pedal position), which relates to the maximum resistive torque or overrun torque requested from the electric motor 6 by a powertrain control unit 26. The relationship between the road load and the accelerator pedal position can be characterised generally as being constantly proportional. However, such a relationship cannot deliver a driving experience comparable to what the driver would expect from driving a vehicle comprising an ICE. To this end, the controller 14 functions to provide an intuitive driving experience.

Figure 3:
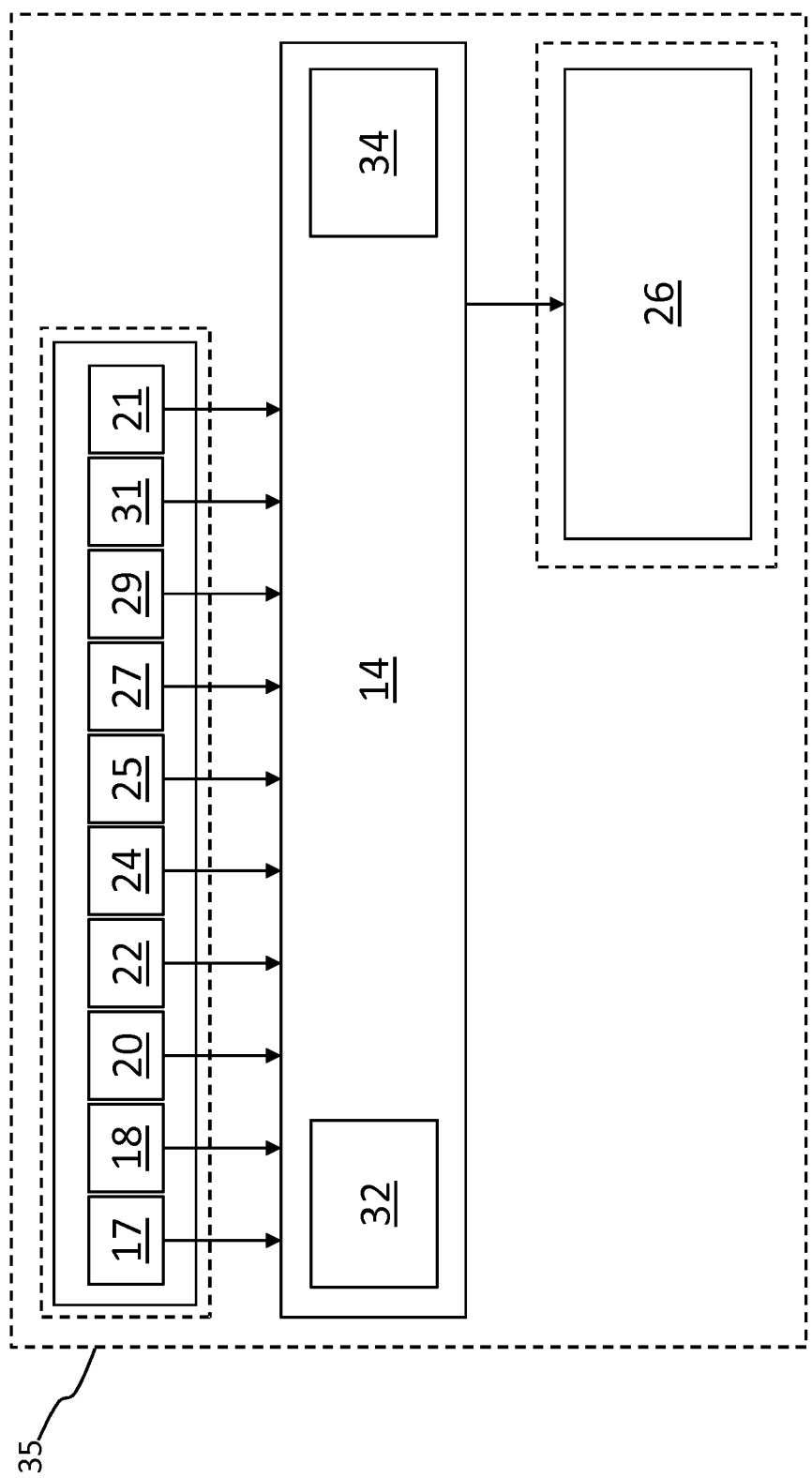
FIG. 3 shows a schematic representation of a controller according to an embodiment of this invention.

With reference to FIG. 3, in accordance with embodiments of the invention, the controller 14 is operable to receive input data regarding the operation of the vehicle 4 and to issue a torque request to the powertrain control unit 26 to achieve a control objective, such as an acceleration demand from the driver of the vehicle 4. The input data comprises a plurality of electrical signals relating to: the accelerator pedal position 17; the vehicle speed 18; the vehicle longitudinal inclination 20; a terrain response mode 22; the current torque 24 being delivered by the electric motor 6; the road load 25; optionally, the road load accelerator pedal position 27; the maximum torque 29 deliverable by the powertrain 2; the overrun torque 31 requested by the powertrain control unit 26; and, the state of charge 21 of the battery 5. In this instance, the vehicle longitudinal inclination 20 relates to the gradient of the surface the vehicle 4 is traversing. These electrical signals, together with the controller 14 and the powertrain control unit 26 form part of a control system 35. The controller 14 comprises a processor 32 configured to convert an accelerator pedal position to a torque output based on one or more accelerator pedal maps, which can be stored in and read from a memory module 34. Alternatively, the controller may be configured to determine the one or more accelerator pedal maps. The skilled reader will appreciate that FIG. 3 is provided only to illustrate an example of a controller 14 architecture in which the invention may be implemented.

Figure 4:
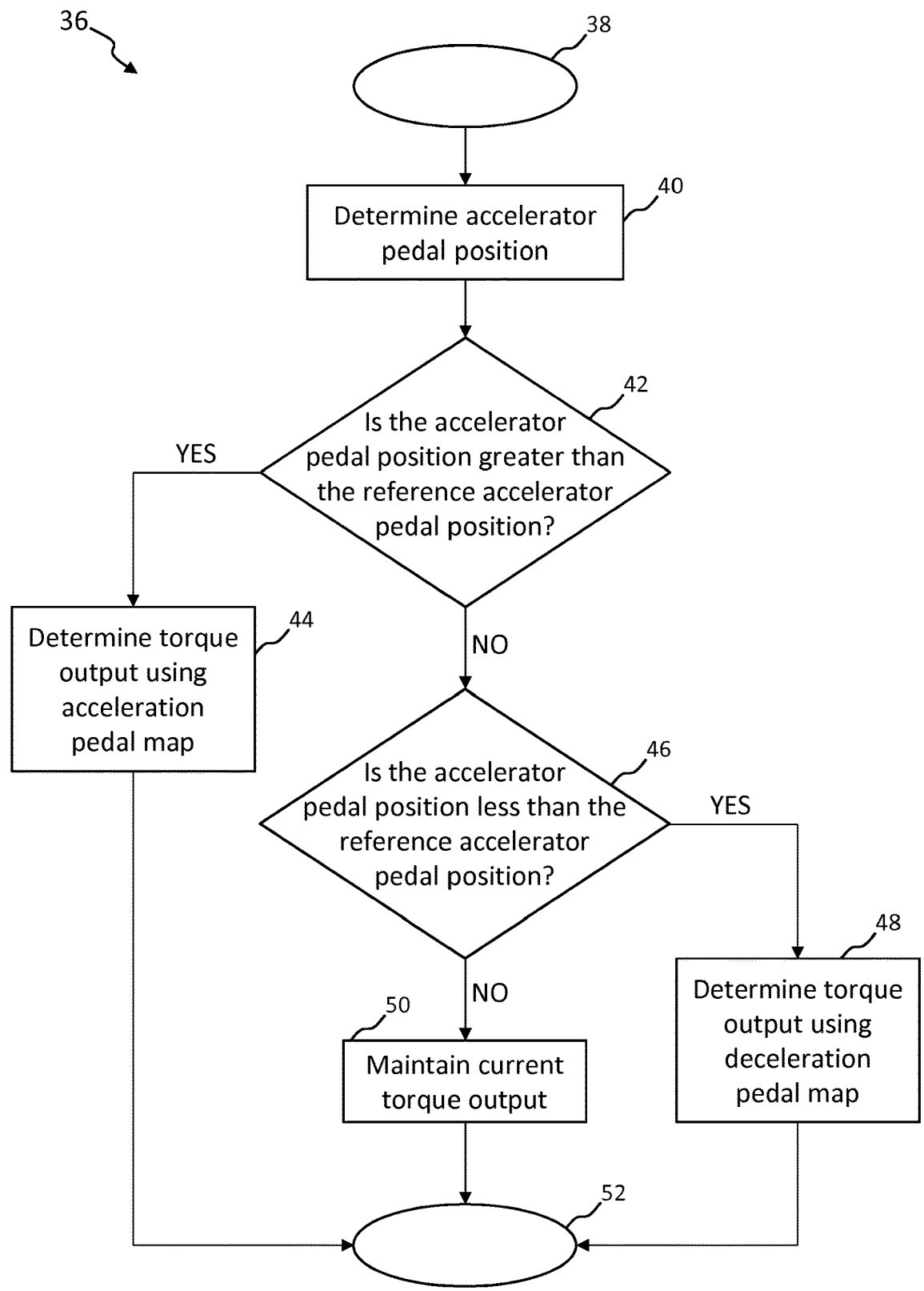
FIG. 4 shows a block diagram summarizing an example of a control method designed according to an embodiment of this invention.

With reference to FIG. 4, in accordance with an embodiment of the invention, the controller 14 incorporates software to implement the process 36 shown in the block diagram. The process 36 initiates at step 38, which may be when the vehicle 4 is operating under road load conditions. At step 40, the current position of the accelerator pedal is determined. The position of the accelerator pedal is then compared, at step 42, against a reference accelerator pedal position to determine if it is greater than the reference accelerator pedal position. The reference accelerator pedal position relates to the road load accelerator pedal position 27. If it is determined that the accelerator pedal position is greater than the reference accelerator pedal position, the process 36 progresses to step 44 where a torque output is determined using an acceleration pedal 54 map before the process 36 terminates at step 52. However, if at step 42 it is determined that the accelerator pedal position is not greater than the reference accelerator pedal position, the process 36 progresses to step 46 where it is determined if the accelerator pedal position equals or is less than the reference accelerator pedal position. If the accelerator pedal position equals the reference accelerator pedal position, the process 36 progresses to step 50 where the current torque output is maintained before the process 36 terminates at step 52. However, if it is determined, at step 46, that the accelerator pedal position is less than the reference accelerator pedal position, the process 36 progresses to step 48 where a torque output is determined using a deceleration pedal map 56 before the process 36 terminates at step 52. It is envisaged that the process 36 could repeat continually (e.g. at every execution cycle of a given software task).

Figure 5:
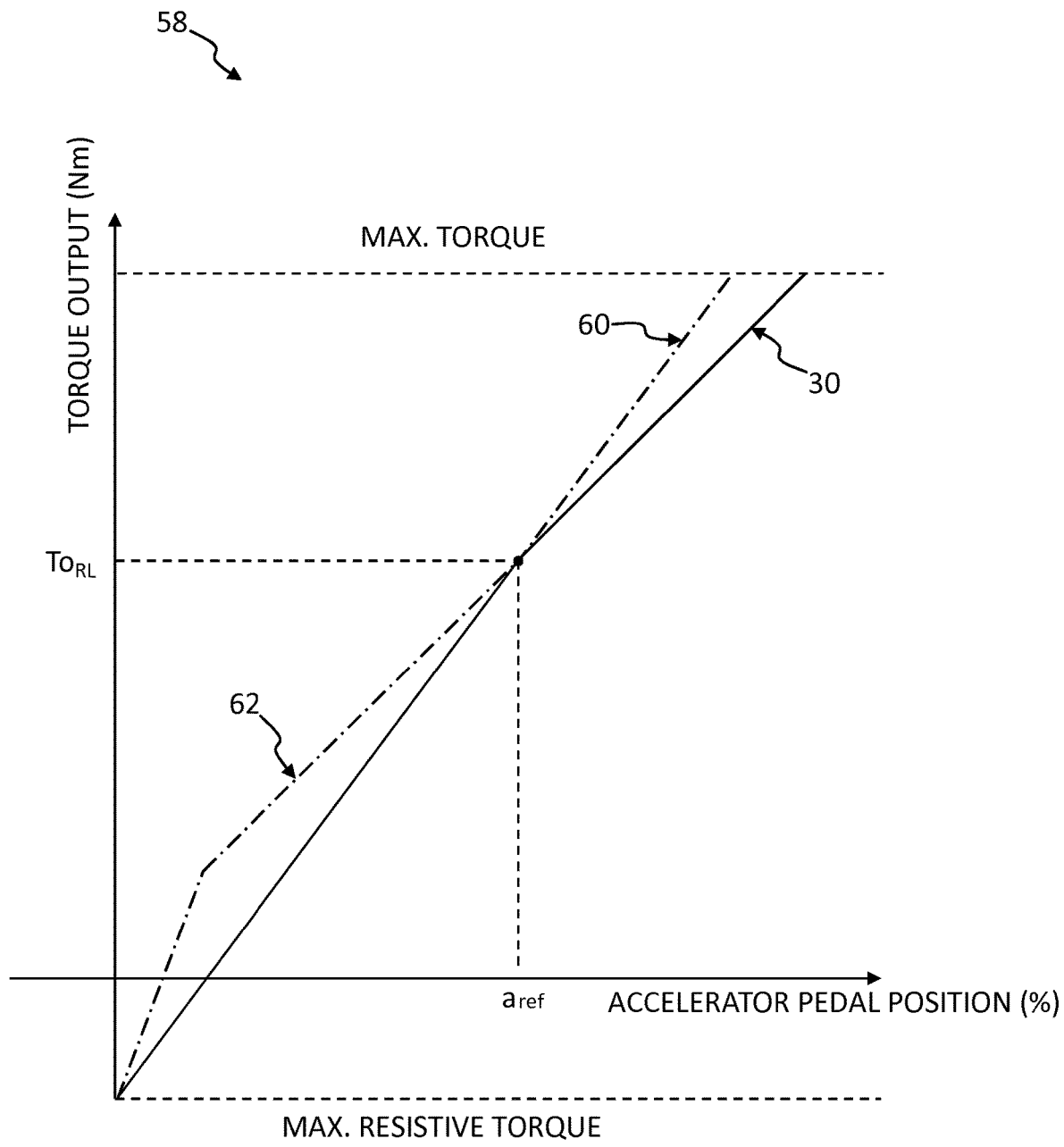
FIG. 5 shows a graph illustrating the torque output produced in response to an accelerator pedal position according to the control method of FIG. 4.

FIG. 5 shows a graph 58, in the form of an accelerator pedal map, illustrating the operation carried out by the process 36. The relationship between the road load and the accelerator pedal position is shown by line 30. The controller 14 is configured to receive a road load signal 25, indicative of the road load (to$_{RL}$), and determine a road load accelerator pedal position signal 27. The road load accelerator pedal position signal 27 is indicative of the reference accelerator pedal position ($a_{ref}$). In this example, the reference accelerator pedal position is the road load accelerator pedal position ($a_{ref}$), but for some implementations or circumstances, it may be desirable to determine the reference accelerator pedal position on the basis of other factors in addition to the road load accelerator pedal position. The controller 14 is further configured to receive an accelerator pedal position signal 17, which indicates the current accelerator pedal position, and compare the reference accelerator pedal position signal 27 and the accelerator pedal position signal 17 to determine the position of the accelerator pedal with respect to the reference accelerator pedal position ($a_{ref}$). If the accelerator pedal position is greater than the reference accelerator pedal position ($a_{ref}$), the controller 14 determines that an acceleration demand has been requested by the driver of the vehicle 4. In this case, a torque output is determined using an acceleration pedal map 60. On the other hand, if the accelerator pedal position is less than the reference accelerator pedal position ($a_{ref}$), the controller 14 decides that a deceleration demand has been requested and determines a torque output using a deceleration pedal map 62. The lower and upper limits of the acceleration pedal map 60 are set by the road load (to$_{RL}$) and the maximum torque deliverable by the powertrain 2, respectively. Whereas, the lower and upper limits of the deceleration pedal map 62 are set by the maximum resistive torque and the road load (to$_{RL}$), respectively. The acceleration and deceleration pedal maps 60, 62 are customisable to provide an intuitive driving experience more akin to driving a vehicle comprising an ICE. For example, the acceleration and deceleration pedal maps 60, 62 could be customised according to the speed of the vehicle 4.

In an embodiment of the invention, the acceleration pedal map 60 comprises a low-speed acceleration pedal map and a high-speed acceleration pedal map. Similarly, the deceleration pedal map 62 comprises a low-speed deceleration pedal map and a high-speed deceleration pedal map. The controller 14 is configured to receive a vehicle speed signal 18, indicative of the speed of the vehicle 4, and determine a torque output in dependence on the vehicle speed signal 18. If the accelerator pedal position is greater than the reference accelerator pedal position ($a_{ref}$) and it is determined that the speed of the vehicle 4 is below a predetermined threshold speed the controller 14 determines a torque output using the low-speed acceleration pedal map. However, if the accelerator pedal position is greater than the reference accelerator pedal position ($a_{ref}$) and the speed of the vehicle 4 is greater than the predetermined threshold speed, the controller 14 determines a torque output using the high-speed acceleration pedal map. Similarly, if the accelerator pedal position is less than the reference accelerator pedal position ($a_{ref}$) and the speed of the vehicle 4 is below the predetermined threshold speed, the controller 14 determines a torque output using the low-speed deceleration pedal map. Moreover, if the accelerator pedal position is less than the reference accelerator pedal position ($a_{ref}$) and the speed of the vehicle 4 is greater than the predetermined threshold speed, the controller 14 determines a torque output using the high-speed deceleration pedal map.

Alternatively, selection of the low-speed and high-speed acceleration and deceleration pedal maps may be dependent on the vehicle speed relative to different speed limits. If the accelerator pedal position is greater than the reference accelerator pedal position ($a_{ref}$) and it is determined that the speed of the vehicle 4 equals or is below a predetermined low-speed limit, the controller 14 determines a torque output using the low-speed acceleration pedal map. However, if the accelerator pedal position is greater than the reference accelerator pedal position ($a_{ref}$) and the speed of the vehicle 4 equals or is greater than a predetermined high-speed limit, the controller 14 determines a torque output using the high-speed acceleration pedal map. Similarly, if the accelerator pedal position is less than the reference accelerator pedal position ($a_{ref}$) and the speed of the vehicle 4 equals or is below a predetermined low-speed limit, the controller 14 determines a torque output using the low-speed deceleration pedal map. Moreover, if the accelerator pedal position is less than the reference accelerator pedal position ($a_{ref}$) and the speed of the vehicle 4 equals or is greater than a predetermined high-speed limit, the controller 14 determines a torque output using the high-speed deceleration pedal map. The controller 14 is further configured to determine a torque output based a combination of the low-speed and high-speed acceleration pedal maps if the accelerator pedal position is greater than the reference accelerator pedal position ($a_{ref}$), but the speed of the vehicle 4 is between the low-speed and high-speed limits. Likewise, a torque output is determined based a combination of the low-speed and high-speed deceleration pedal maps when the accelerator pedal position is less than the reference accelerator pedal position ($a_{ref}$), but the speed of the vehicle 4 is between the low-speed and high-speed limits. Combining pedal maps may be done by interpolating between the low-speed and high-speed pedal maps in dependence on the vehicle speed.

In a further embodiment of the invention, the controller 14 may also be configured to modify the acceleration and deceleration pedal maps, or the low-speed and high-speed versions thereof, using a gradient modifier to take into account a gradient of the surface the vehicle 4 is traversing. The controller 14 determines the gradient modifier in dependence on the vehicle longitudinal inclination or gradient signal 20.

Figure 6:
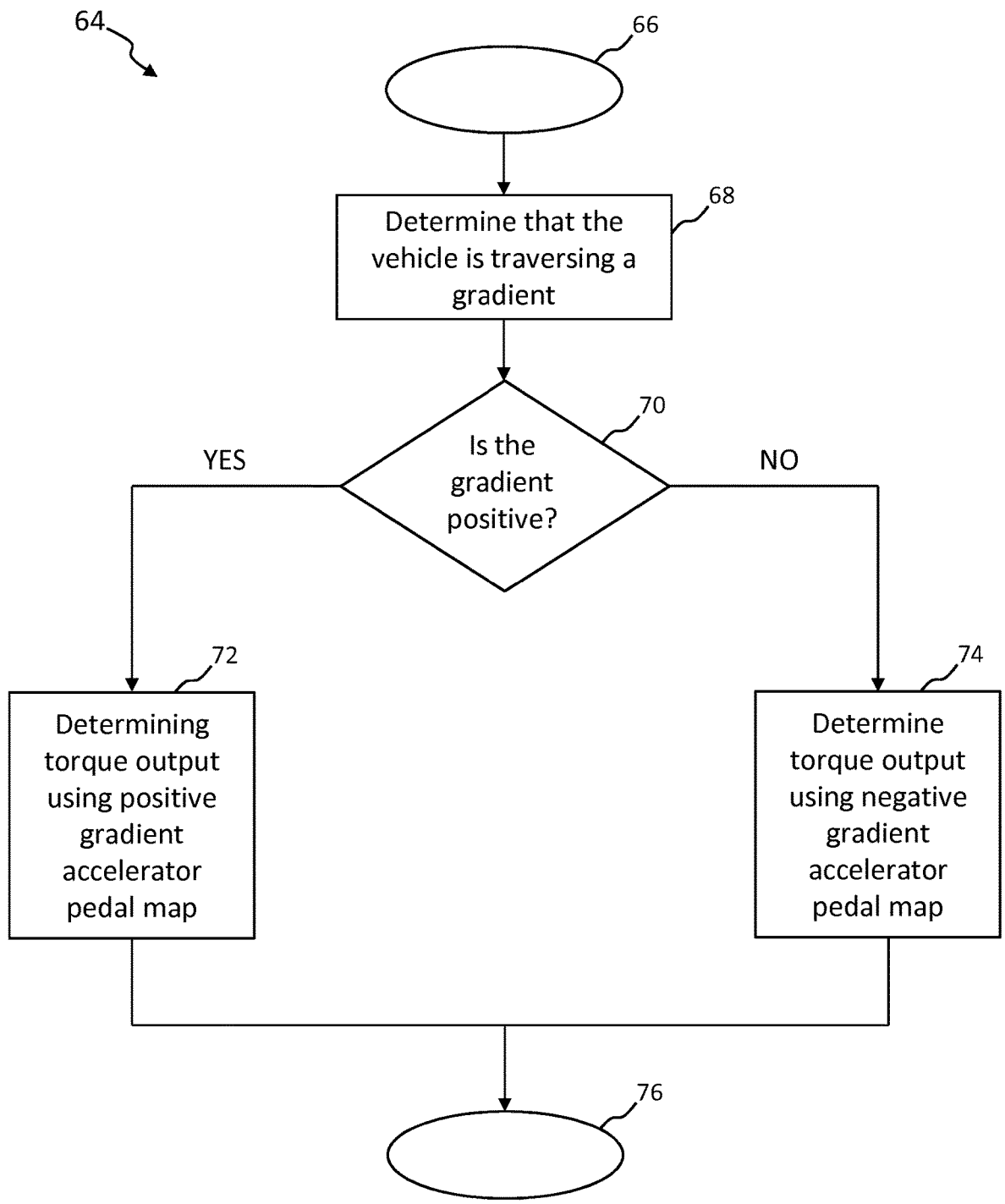
FIG. 6 shows a block diagram summarizing an example of a control method designed according to an embodiment of this invention.

With reference to FIG. 6, in accordance with an embodiment of the invention, the controller 14 incorporates software to implement the process 64 shown in the block diagram. The process 64 initiates at step 66 and progresses to step 68, where it is determined whether the vehicle 4 is traversing a gradient. This can be done using the vehicle longitudinal inclination or gradient signal 20. If it is determined that the vehicle 4 is traversing a gradient, the process 64 moves to step 70 where it is determined whether the gradient is a positive gradient or a negative gradient. If, at step 70, it is determined that the vehicle 4 is traversing a positive gradient, the process 64 moves to step 72 and a torque output is determined using a positive gradient pedal map. However, if, at step 70, it is determined that the vehicle 4 is traversing a negative gradient, the process 64 moves to step 74 and a torque output is determined using a negative gradient pedal map. Following steps 72, 74, the process 64 terminates at step 76. Basing the torque output on accelerator pedal maps that have been modified to account for the gradient of the surface the vehicle 4 is traversing prevents the perceived performance reduction that occurs in electric vehicles, which do not have a traditional gearbox, and offers the opportunity to enhance an electrified powertrain capability feel over a conventional one.

Figure 7:
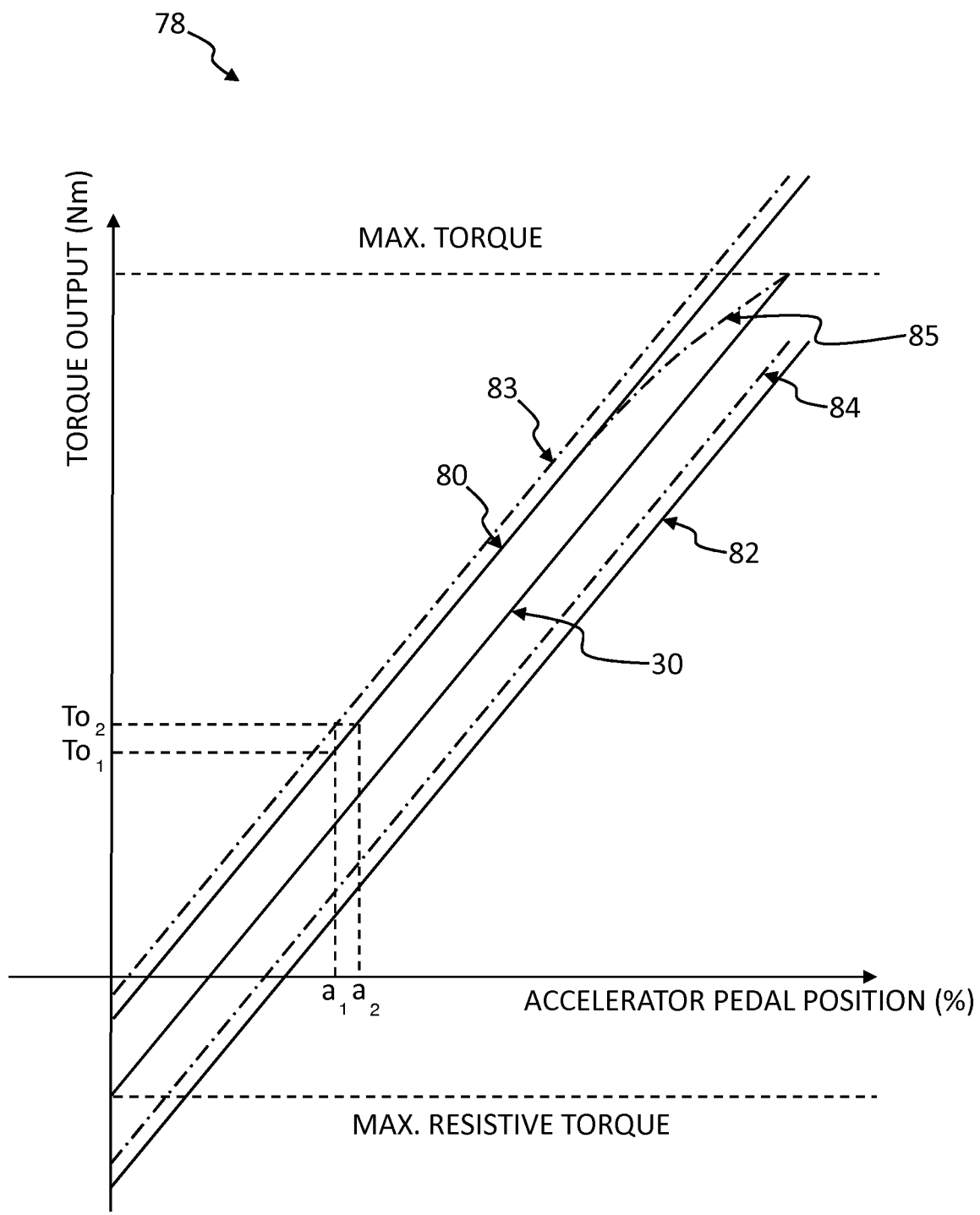
FIG. 7 shows a graph illustrating the torque output produced in response to an accelerator pedal position according to the control method of FIG. 6; and, FIG. 8 shows a graph illustrating the torque output produced in response to an accelerator pedal position according to a control method designed according to an embodiment of this invention.

FIG. 7 shows a graph 78 illustrating the operation carried out by the process 64. The graph 78 comprises three accelerator pedal maps. Line 30 shows an accelerator pedal map under road load conditions, and lines 80, 82 are the positive gradient and the negative gradient accelerator pedal maps respectively. That is, lines 80, 82 are accelerator pedal maps that have been altered to account for a positive gradient and a negative gradient respectively. The degree to which lines 80, 82 are altered may also be influenced by the terrain response mode selected by the driver of the vehicle 4, in addition to gradient. The controller 14 is configured to determine the selected terrain response mode using the terrain response mode signal 22. It can be seen from line 80 that the torque output is greater, for the same accelerator pedal position, when compared to road load conditions.

Conversely, line 82 shows that the torque output is less when compared to road load conditions for the same accelerator pedal position.

The graph 78 comprises two additional accelerator pedal maps, lines 83, 84. These lines 83, 84 represent the torque output necessary for maintaining the speed of the vehicle 4 when going from road load conditions to traversing a positive gradient or a negative gradient respectively. Lines 83, 84 have been altered to account for the same gradients as lines 80, 82. When the vehicle 4 is traversing a positive gradient, the controller 14 functions to determine torque output using the positive gradient accelerator pedal map, line 80. It can be seen from comparing lines 80, 83 that, for the same accelerator pedal position ($a_1$), the torque output ($to_1$) from the positive gradient accelerator pedal map, line 80, is less than the torque ($to_2$) necessary for maintaining the speed of the vehicle 4 while traversing the positive gradient. That is, the positive gradient accelerator pedal map, line 80, used by the controller 14 purposively under compensates for the positive gradient. In order to maintain the speed of the vehicle 4, the driver of the vehicle 4 is required to press the accelerator pedal to position ($a_2$) to achieve the required torque output ($to_2$). This situation is constructed by the controller 14 in order to provide an intuitive driving experience in which the driver would expect to have to press the accelerator pedal to some extent when traversing a positive gradient based on their experience of driving a vehicle comprising an ICE.

Similarly, the driver would expect to have to lift-off or release the accelerator pedal when going downhill. In view of that, the negative gradient accelerator pedal map, line 82, used by the controller 14 purposively over compensates for the negative gradient, and so the driver of the vehicle 4 is required to release the accelerator pedal in order to maintain the speed of the vehicle 4 when traversing a negative gradient.

It can be seen that the upper limit of the positive gradient accelerator pedal map, line 80, is offset from the road load accelerator pedal map, line 30, such that it exceeds the maximum torque deliverable by the powertrain 2. This is done in order to prevent the effect of the gradient modification from dissipating, as indicated by line 85, as the torque demand increases away from the road load and towards the maximum torque deliverable by the powertrain 2, which would be counter-intuitive for the driver of the vehicle 4.

In a further embodiment of the invention, the controller 14 may determine an accelerator pedal map on receiving the state of charge signal 21, which indicates that the state of charge of the battery 5 is below a predetermined threshold, and determine a torque output in dependence on the accelerator pedal map.

Figure 8:
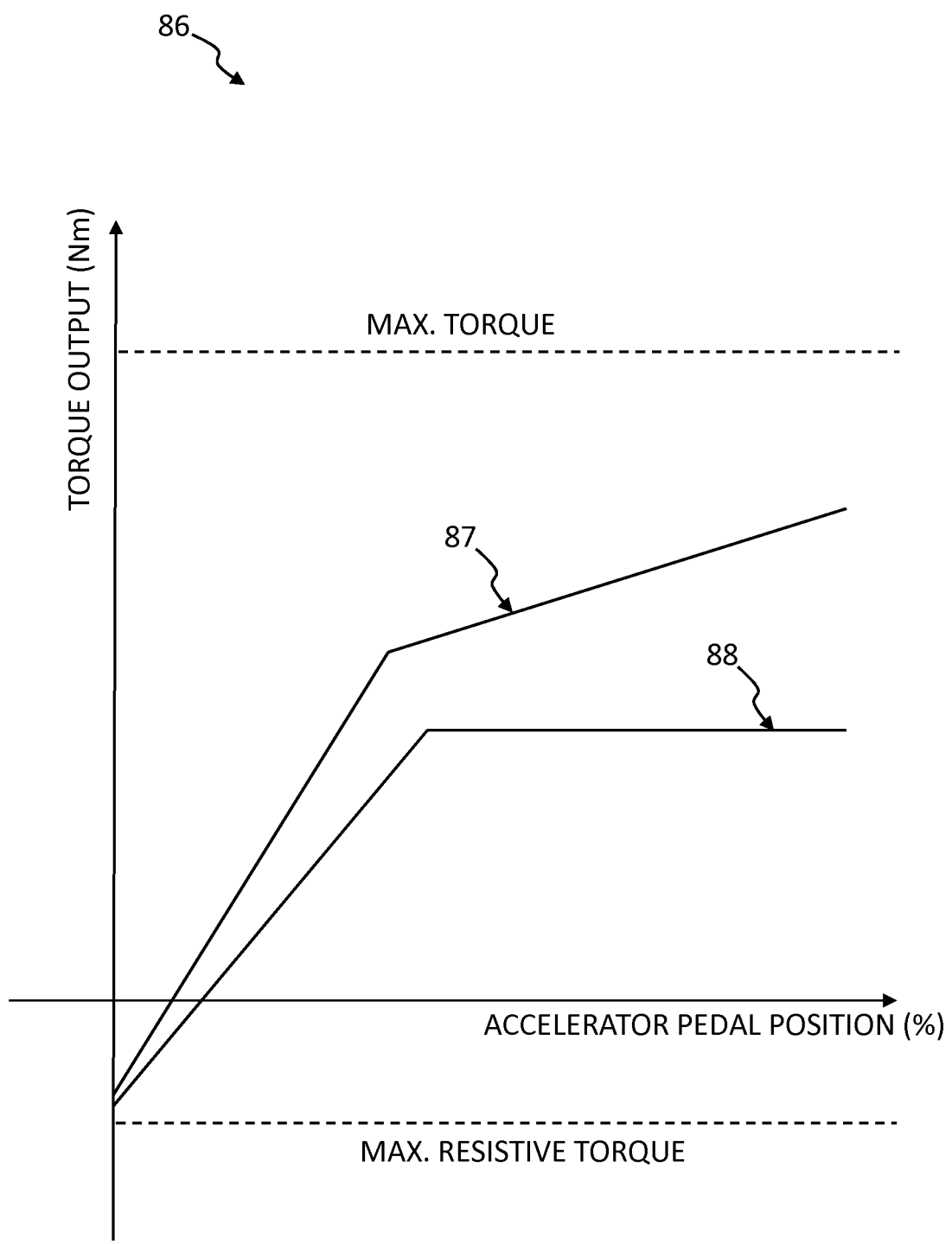

FIG. 8 shows a graph 86 including an accelerator pedal map 87 in accordance with this embodiment of the invention. The graph 86 includes an additional accelerator pedal map 88. The additional accelerator pedal map 88 is an example of how known accelerator pedal maps are modified when the state of charge of an energy storage means on an electric vehicle falls below a threshold. In this example, it can be seen that the accelerator pedal map 88 initially increases with the accelerator pedal position, after which a torque limit is applied and the torque output remains constant as the accelerator pedal position increases. However, rather than applying a torque limit, the accelerator pedal map 87 is configured to deliver increasing amounts of torque with respect to pedal position up to a maximum which is less that the maximum torque deliverable by the powertrain 2. Although this results in an overall lower output torque, the behaviour of the vehicle 4 is made to be more intuitive for the driver when compared to simply applying a torque limit. In embodiments of the invention, the accelerator pedal map 87 is configured to maximise the range of the vehicle 4, increasing the likelihood of the vehicle 4 reaching its destination. Moreover, the accelerator pedal map 87 could be configured so that the torque delivered over the first part of the accelerator pedal range is delivered at a higher rate when compared to the torque delivered over the second part of the accelerator pedal range. This means that the driver is able to accelerate in city traffic conditions and maintain a high cruising speed, but the vehicle 4 will have a lower acceleration in the second part of the accelerator pedal range.

The controller may be configured to selectively inhibit or modify the application of acceleration or deceleration pedal maps in dependence on the surface over which the vehicle is travelling.

The controller may be configured to selectively inhibit or modify the application of acceleration or deceleration pedal maps in dependence on a received or determined terrain mode, or a terrain type received from a further vehicle system or controller.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Figure 9:
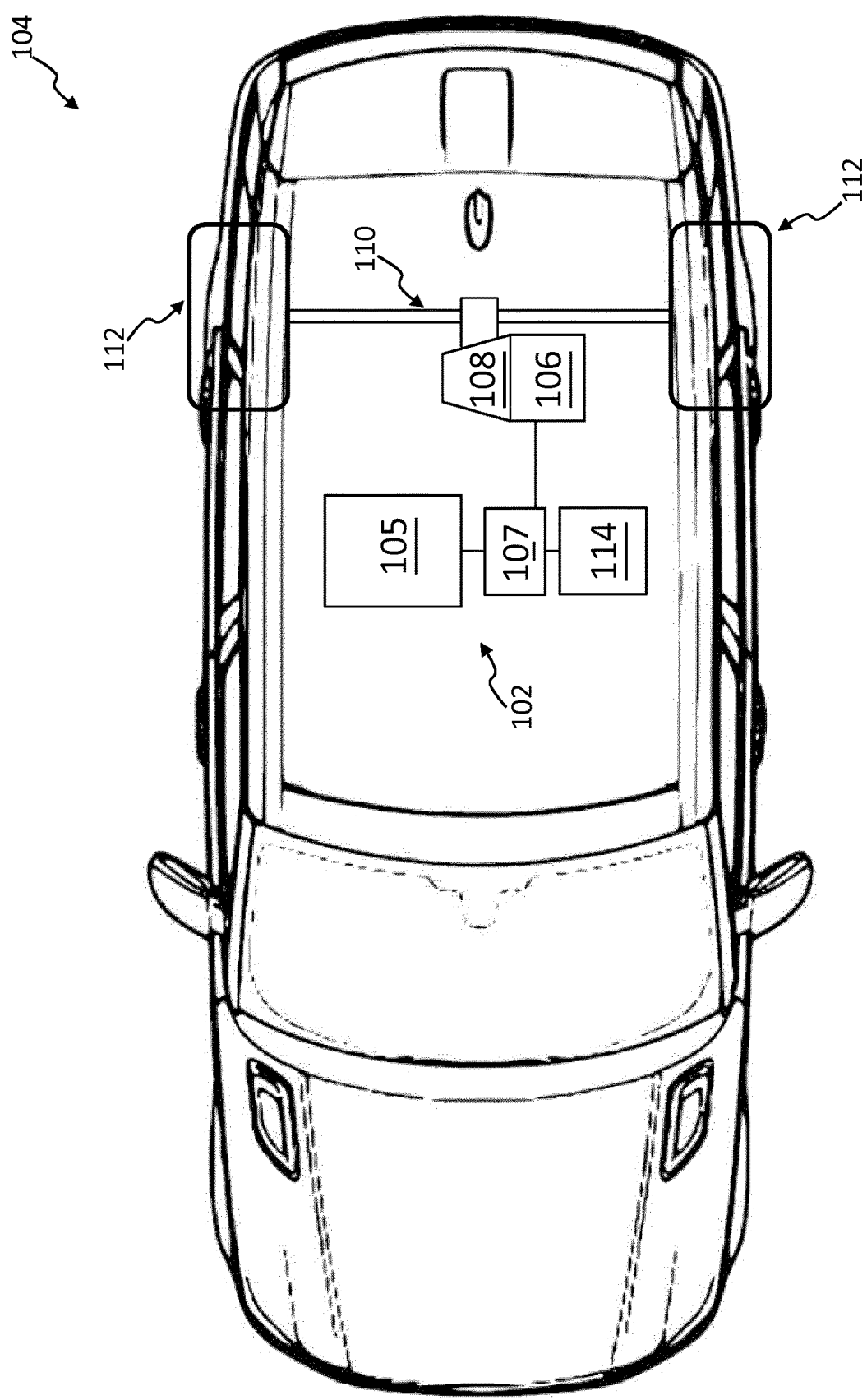
FIG. 9 shows a schematic representation of a powertrain for use with an embodiment of this invention.

With reference to FIG. 9, a powertrain, designated generally as 102, of an electric vehicle 104 is shown in plan view. The powertrain 102 comprises an energy storage means, in the form of a battery 105, operatively connected via an inverter 107 to an electric motor 106, which generates torque, and a drive transmission 108. The drive transmission 108 could take the form of a differential (no disconnection mechanism or gears). The torque is transferred through a driveline 110 to wheels 112 that generate a tractive force to move the vehicle 104. A controller 114 is operatively connected to the electric motor 106 by the inverter 107, and functions to control the generation of torque by converting an accelerator pedal position to a torque output using an accelerator pedal map. Although FIG. 9 only shows one motor 106 driving the wheels of a rear axle, it will apparent that the vehicle 104 may be arranged so that it has one motor driving the wheels of a front axle, or may have at least one additional motor to drive the wheels of both the front a and rear axles, or additional motors to drive individual wheels.

Figure 10:
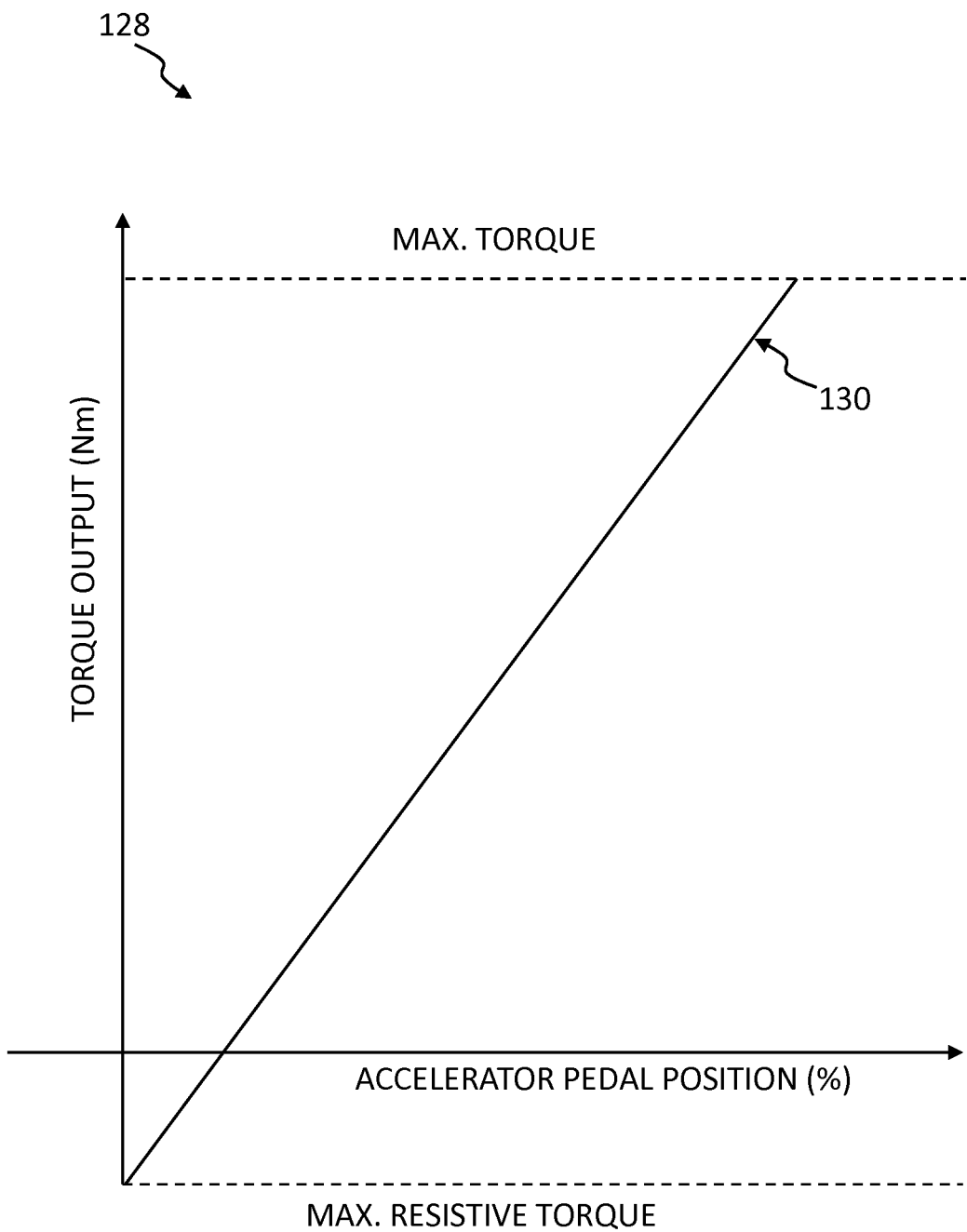
FIG. 10 shows a graph illustrating the torque output produced in response to an accelerator pedal position at road load conditions.

FIG. 10 shows a graph 128, in the form of an accelerator pedal map, relating the torque requested from the electric motor 106 to the travel of the accelerator pedal. The skilled reader will understand that this is a simplified section through a map that may also incorporates vehicle speed or actuator speed. A full map would consist of a torque surface in the Z (vertical) axis based on the accelerator pedal position in one axis and the motor speed or vehicle speed in another axis. The required torque is the output. Line 130 shows the road load plotted against the position of the accelerator pedal. For clarity, the term "road load" refers to the torque that opposes the movement of the vehicle 104 or, in other words, the torque necessary for maintaining the speed of the vehicle 104. Line 130 shows that the torque increases with respect to the accelerator pedal position to a maximum torque output relating to the maximum torque deliverable by the powertrain 102 when the accelerator pedal is fully pressed (100% accelerator pedal position). Conversely, the torque output decreases with respect to pedal position to a minimum when the accelerator pedal is fully released (0% accelerator pedal position), which relates to the maximum resistive torque or overrun torque requested from the electric motor 106 by a powertrain control unit 126. The relationship between the road load and the accelerator pedal position can be characterised generally as being constantly proportional. However, such a relationship cannot deliver a driving experience comparable to what the driver would expect from driving a vehicle comprising an ICE. To this end, the controller 114 functions to provide an intuitive driving experience.

Figure 11:
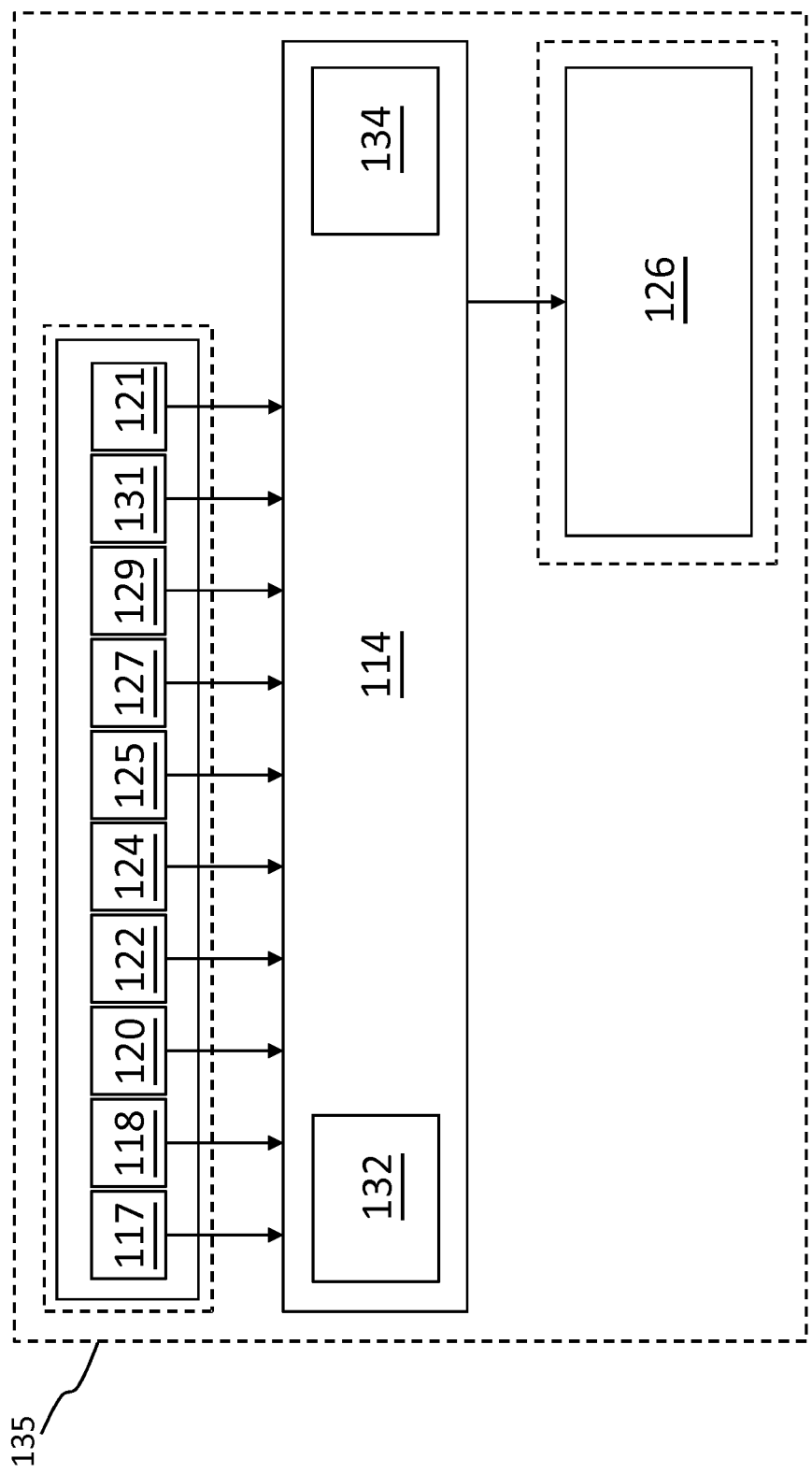
FIG. 11 shows a schematic representation of a controller according to an embodiment of this invention.

With reference to FIG. 11, in accordance with embodiments of the invention, the controller 114 is operable to receive input data regarding the operation of the vehicle 104 and to issue a torque request to the powertrain control unit 126 to achieve a control objective, such as an acceleration demand from the driver of the vehicle 104. The input data comprises a plurality of electrical signals relating to: the accelerator pedal position 117; the vehicle speed 118; the vehicle longitudinal inclination 120; a terrain response mode 122; the current torque 124 being delivered by the electric motor 106; the road load 125; optionally, the road load accelerator pedal position 127; the maximum torque 129 deliverable by the powertrain 102; the overrun torque 131 requested by the powertrain control unit 126; and, the state of charge 121 of the battery 105. In this instance, the vehicle longitudinal inclination 120 relates to the gradient of the surface the vehicle 104 is traversing. These electrical signals, together with the controller 114 and the powertrain control unit 126 form part of a control system 135. The controller 114 comprises a processor 132 configured to convert an accelerator pedal position to a torque output based on one or more accelerator pedal maps, which can be stored in and read from a memory module 134. Alternatively, the controller may be configured to determine the one or more accelerator pedal maps. The skilled reader will appreciate that FIG. 103 is provided only to illustrate an example of a controller 114 architecture in which the invention may be implemented.

Figure 12:
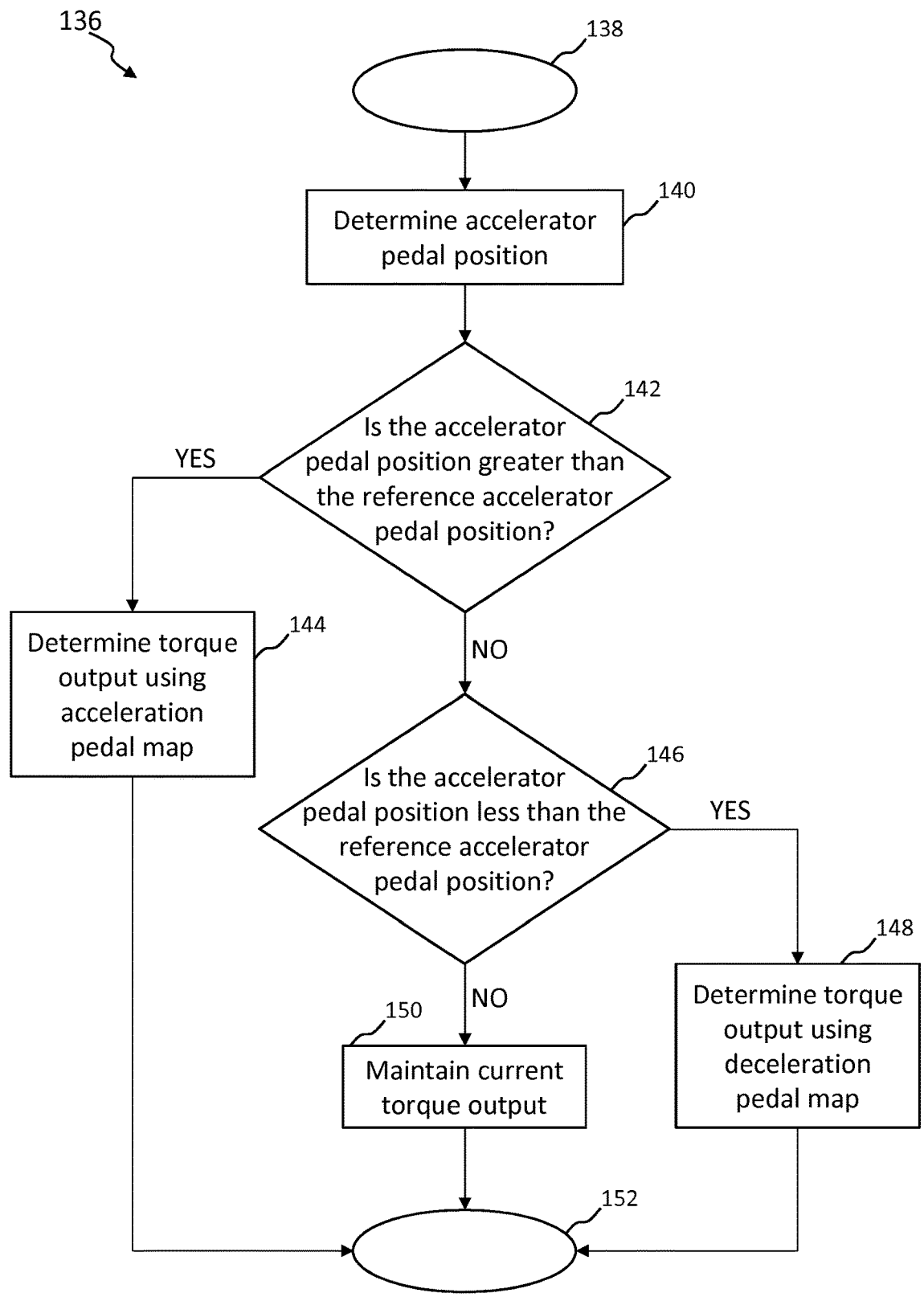
FIG. 12 shows a block diagram summarizing an example of a control method designed according to an embodiment of this invention.

With reference to FIG. 12, in accordance with an embodiment of the invention, the controller 114 incorporates software to implement the process 136 shown in the block diagram. The process 136 initiates at step 138, which may be when the vehicle 104 is operating under road load conditions. At step 140, the current position of the accelerator pedal is determined. The position of the accelerator pedal is then compared, at step 142, against a reference accelerator pedal position to determine if it is greater than the reference accelerator pedal position. The reference accelerator pedal position relates to the road load accelerator pedal position 127. If it is determined that the accelerator pedal position is greater than the reference accelerator pedal position, the process 136 progresses to step 144 where a torque output is determined using an acceleration pedal 154 map before the process 136 terminates at step 152. However, if at step 142 it is determined that the accelerator pedal position is not greater than the reference accelerator pedal position, the process 136 progresses to step 146 where it is determined if the accelerator pedal position equals or is less than the reference accelerator pedal position. If the accelerator pedal position equals the reference accelerator pedal position, the process 136 progresses to step 150 where the current torque output is maintained before the process 136 terminates at step 152. However, if it is determined, at step 146, that the accelerator pedal position is less than the reference accelerator pedal position, the process 136 progresses to step 148 where a torque output is determined using a deceleration pedal map 156 before the process 136 terminates at step 152. It is envisaged that the process 136 could repeat continually (e.g. at every execution cycle of a given software task).

Figure 13:
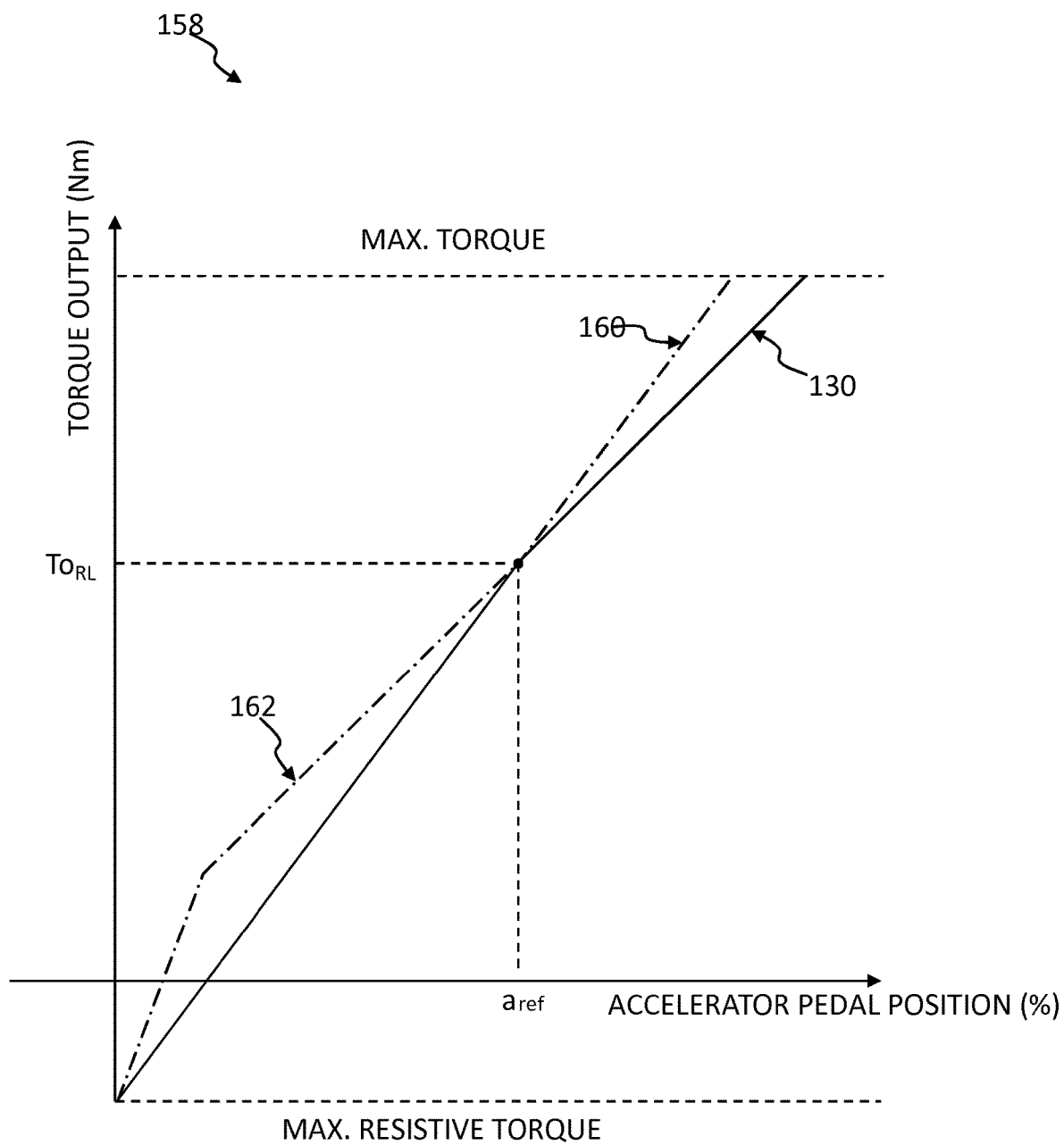
FIG. 13 shows a graph illustrating the torque output produced in response to an accelerator pedal position according to the control method of FIG. 12.

FIG. 13 shows a graph 158, in the form of an accelerator pedal map, illustrating the operation carried out by the process 136. The relationship between the road load and the accelerator pedal position is shown by line 130. The controller 114 is configured to receive a road load signal 125, indicative of the road load ($to_{RL}$), and determine a road load accelerator pedal position signal 127. The road load accelerator pedal position signal 127 is indicative of the reference accelerator pedal position ($a_{ref}$). In this example, the reference accelerator pedal position is the road load accelerator pedal position ($a_{ref}$), but for some implementations or circumstances, it may be desirable to determine the reference accelerator pedal position on the basis of other factors in addition to the road load accelerator pedal position. The controller 114 is further configured to receive an accelerator pedal position signal 117, which indicates the current accelerator pedal position, and compare the reference accelerator pedal position signal 127 and the accelerator pedal position signal 117 to determine the position of the accelerator pedal with respect to the reference accelerator pedal position ($a_{ref}$). If the accelerator pedal position is greater than the reference accelerator pedal position ($a_{ref}$), the controller 114 determines that an acceleration demand has been requested by the driver of the vehicle 104. In this case, a torque output is determined using an acceleration pedal map 160. On the other hand, if the accelerator pedal position is less than the reference accelerator pedal position ($a_{ref}$), the controller 114 decides that a deceleration demand has been requested and determines a torque output using a deceleration pedal map 162. The lower and upper limits of the acceleration pedal map 160 are set by the road load ($to_{RL}$) and the maximum torque deliverable by the powertrain 102, respectively. Whereas, the lower and upper limits of the deceleration pedal map 162 are set by the maximum resistive torque and the road load ($to_{RL}$), respectively. The acceleration and deceleration pedal maps 160,162 are customisable to provide an intuitive driving experience more akin to driving a vehicle comprising an ICE. For example, the acceleration and deceleration pedal maps 160, 162 could be customised according to the speed of the vehicle 104.

In an embodiment of the invention, the acceleration pedal map 160 comprises a low-speed acceleration pedal map and a high-speed acceleration pedal map. Similarly, the deceleration pedal map 162 comprises a low-speed deceleration pedal map and a high-speed deceleration pedal map. The controller 114 is configured to receive a vehicle speed signal 118, indicative of the speed of the vehicle 104, and determine a torque output in dependence on the vehicle speed signal 118. If the accelerator pedal position is greater than the reference accelerator pedal position ($a_{ref}$) and it is determined that the speed of the vehicle 104 is below a predetermined threshold speed the controller 114 determines a torque output using the low-speed acceleration pedal map. However, if the accelerator pedal position is greater than the reference accelerator pedal position ($a_{ref}$) and the speed of the vehicle 104 is greater than the predetermined threshold speed, the controller 114 determines a torque output using the high-speed acceleration pedal map. Similarly, if the accelerator pedal position is less than the reference accelerator pedal position ($a_{ref}$) and the speed of the vehicle 104 is below the predetermined threshold speed, the controller 114 determines a torque output using the low-speed deceleration pedal map. Moreover, if the accelerator pedal position is less than the reference accelerator pedal position ($a_{ref}$) and the speed of the vehicle 104 is greater than the predetermined threshold speed, the controller 114 determines a torque output using the high-speed deceleration pedal map.

Alternatively, selection of the low-speed and high-speed acceleration and deceleration pedal maps may be dependent on the vehicle speed relative to different speed limits. If the accelerator pedal position is greater than the reference accelerator pedal position ($a_{ref}$) and it is determined that the speed of the vehicle 104 equals or is below a predetermined low-speed limit, the controller 114 determines a torque output using the low-speed acceleration pedal map. However, if the accelerator pedal position is greater than the reference accelerator pedal position ($a_{ref}$) and the speed of the vehicle 104 equals or is greater than a predetermined high-speed limit, the controller 114 determines a torque output using the high-speed acceleration pedal map. Similarly, if the accelerator pedal position is less than the reference accelerator pedal position ($a_{ref}$) and the speed of the vehicle 104 equals or is below a predetermined low-speed limit, the controller 114 determines a torque output using the low-speed deceleration pedal map. Moreover, if the accelerator pedal position is less than the reference accelerator pedal position ($a_{ref}$) and the speed of the vehicle 104 equals or is greater than a predetermined high-speed limit, the controller 114 determines a torque output using the high-speed deceleration pedal map. The controller 114 is further configured to determine a torque output based a combination of the low-speed and high-speed acceleration pedal maps if the accelerator pedal position is greater than the reference accelerator pedal position ($a_{ref}$), but the speed of the vehicle 104 is between the low-speed and high-speed limits. Likewise, a torque output is determined based a combination of the low-speed and high-speed deceleration pedal maps when the accelerator pedal position is less than the reference accelerator pedal position ($a_{ref}$), but the speed of the vehicle 104 is between the low-speed and high-speed limits. Combining pedal maps may be done by interpolating between the low-speed and high-speed pedal maps in dependence on the vehicle speed.

In a further embodiment of the invention, the controller 114 may also be configured to modify the acceleration and deceleration pedal maps, or the low-speed and high-speed versions thereof, using a gradient modifier to take into account a gradient of the surface the vehicle 104 is traversing. The controller 114 determines the gradient modifier in dependence on the vehicle longitudinal inclination or gradient signal 120.

Figure 14:
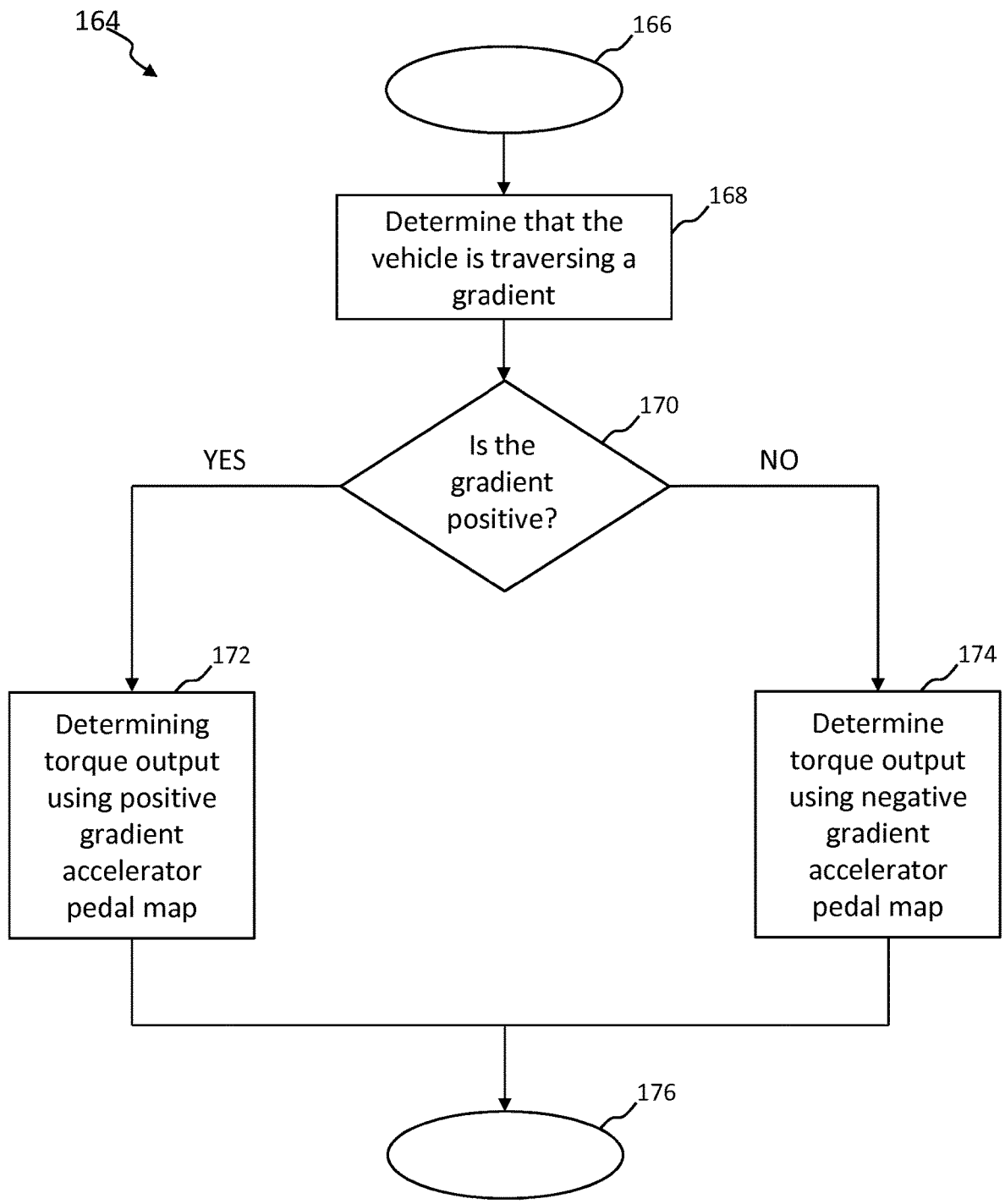
FIG. 14 shows a block diagram summarizing an example of a control method designed according to an embodiment of this invention.

With reference to FIG. 14, in accordance with an embodiment of the invention, the controller 114 incorporates software to implement the process 164 shown in the block diagram. The process 164 initiates at step 166 and progresses to step 168, where it is determined whether the vehicle 104 is traversing a gradient. This can be done using the vehicle longitudinal inclination or gradient signal 120. If it is determined that the vehicle 104 is traversing a gradient, the process 164 moves to step 170 where it is determined whether the gradient is a positive gradient or a negative gradient. If, at step 170, it is determined that the vehicle 104 is traversing a positive gradient, the process 164 moves to step 172 and a torque output is determined using a positive gradient pedal map. However, if, at step 170, it is determined that the vehicle 104 is traversing a negative gradient, the process 164 moves to step 174 and a torque output is determined using a negative gradient pedal map. Following steps 172, 174, the process 164 terminates at step 176. Basing the torque output on accelerator pedal maps that have been modified to account for the gradient of the surface the vehicle 104 is traversing prevents the perceived performance reduction that occurs in electric vehicles, which do not have a traditional gearbox, and offers the opportunity to enhance an electrified powertrain capability feel over a conventional one.

Figure 15:
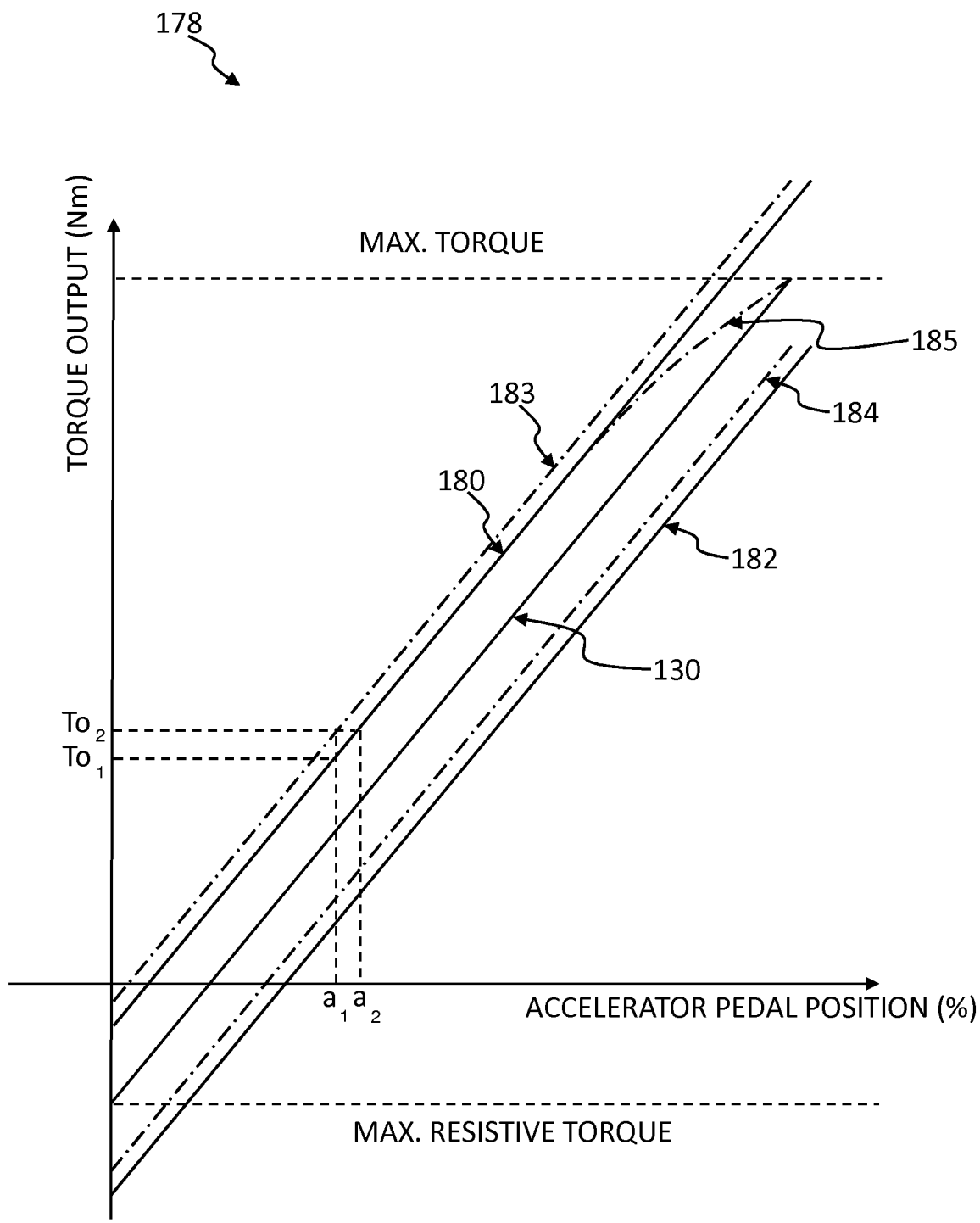
FIG. 15 shows a graph illustrating the torque output produced in response to an accelerator pedal position according to the control method of FIG. 14; and, FIG. 16 shows a graph illustrating the torque output produced in response to an accelerator pedal position according to a control method designed according to an embodiment of this invention.

FIG. 15 shows a graph 178 illustrating the operation carried out by the process 164. The graph 178 comprises three accelerator pedal maps. Line 130 shows an accelerator pedal map under road load conditions, and lines 180, 182 are the positive gradient and the negative gradient accelerator pedal maps respectively. That is, lines 180, 182 are accelerator pedal maps that have been altered to account for a positive gradient and a negative gradient respectively. The degree to which lines 180, 182 are altered may also be influenced by the terrain response mode selected by the driver of the vehicle 104, in addition to gradient. The controller 114 is configured to determine the selected terrain response mode using the terrain response mode signal 122. It can be seen from line 180 that the torque output is greater, for the same accelerator pedal position, when compared to road load conditions. Conversely, line 182 shows that the torque output is less when compared to road load conditions for the same accelerator pedal position.

The graph 178 comprises two additional accelerator pedal maps, lines 183, 184. These lines 183, 184 represent the torque output necessary for maintaining the speed of the vehicle 104 when going from road load conditions to traversing a positive gradient or a negative gradient respectively. Lines 183, 184 have been altered to account for the same gradients as lines 180, 182. When the vehicle 104 is traversing a positive gradient, the controller 114 functions to determine torque output using the positive gradient accelerator pedal map, line 180. It can be seen from comparing lines 180, 183 that, for the same accelerator pedal position ($a_1$), the torque output ($to_1$) from the positive gradient accelerator pedal map, line 180, is less than the torque (toe) necessary for maintaining the speed of the vehicle 4 while traversing the positive gradient. That is, the positive gradient accelerator pedal map, line 180, used by the controller 114 purposively under compensates for the positive gradient. In order to maintain the speed of the vehicle 104, the driver of the vehicle 104 is required to press the accelerator pedal to position ($a_2$) to achieve the required torque output ($to_2$). This situation is constructed by the controller 114 in order to provide an intuitive driving experience in which the driver would expect to have to press the accelerator pedal to some extent when traversing a positive gradient based on their experience of driving a vehicle comprising an ICE.

Similarly, the driver would expect to have to lift-off or release the accelerator pedal when going downhill. In view of that, the negative gradient accelerator pedal map, line 182, used by the controller 114 purposively over compensates for the negative gradient, and so the driver of the vehicle 104 is required to release the accelerator pedal in order to maintain the speed of the vehicle 4 when traversing a negative gradient.

It can be seen that the upper limit of the positive gradient accelerator pedal map, line 180, is offset from the road load accelerator pedal map, line 130, such that it exceeds the maximum torque deliverable by the powertrain 102. This is done in order to prevent the effect of the gradient modification from dissipating, as indicated by line 185, as the torque demand increases away from the road load and towards the maximum torque deliverable by the powertrain 102, which would be counter-intuitive for the driver of the vehicle 104.

In some circumstances, particularly in off-highway or off-road terrain, it may be undesirable to modify the pedal response in this way, for example when traversing some terrain types where consistent control of the vehicle torque irrespective of the gradient is desirable. The controller may be configured to inhibit the positive gradient pedal map and/or the negative gradient pedal map in dependence on a terrain mode of the vehicle. The terrain mode may be selected by a driver of the vehicle, or determined automatically by a control system of the vehicle. For example, the controller may be configured to inhibit the positive gradient pedal map and/or the negative gradient pedal map the terrain mode of the vehicle is a sand mode or a rock mode.

In a further embodiment of the invention, the controller 114 may determine an accelerator pedal map on receiving the state of charge signal 121, which indicates that the state of charge of the battery 105 is below a predetermined threshold, and determine a torque output in dependence on the accelerator pedal map.

Figure 16:
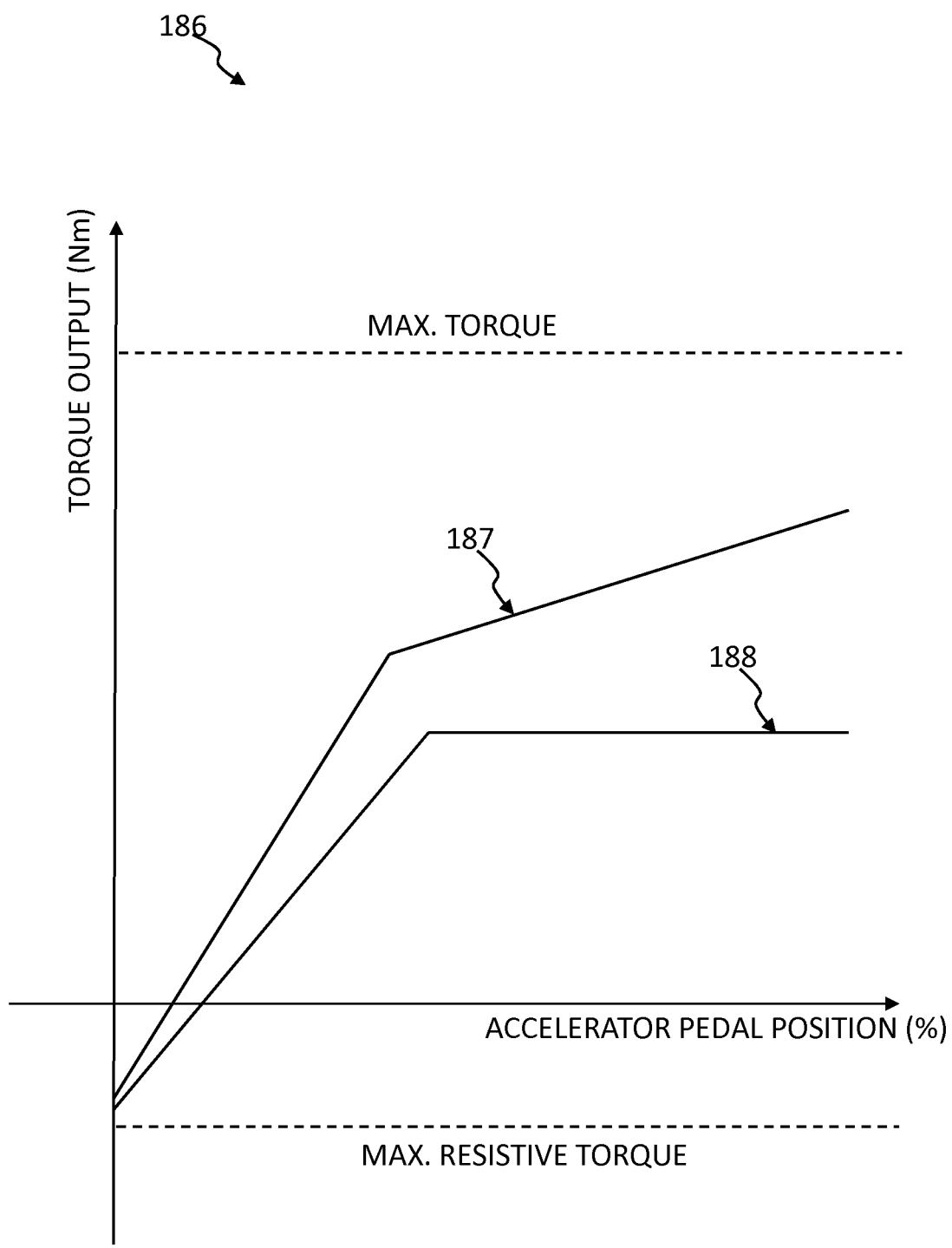

FIG. 16 shows a graph 186 including an accelerator pedal map 187 in accordance with this embodiment of the invention. The graph 186 includes an additional accelerator pedal map 188. The additional accelerator pedal map 188 is an example of how known accelerator pedal maps are modified when the state of charge of an energy storage means on an electric vehicle falls below a threshold. In this example, it can be seen that the accelerator pedal map 188 initially increases with the accelerator pedal position, after which a torque limit is applied and the torque output remains constant as the accelerator pedal position increases. However, rather than applying a torque limit, the accelerator pedal map 187 is configured to deliver increasing amounts of torque with respect to pedal position up to a maximum which is less that the maximum torque deliverable by the powertrain 102. Although this results in an overall lower output torque, the behaviour of the vehicle 104 is made to be more intuitive for the driver when compared to simply applying a torque limit. In embodiments of the invention, the accelerator pedal map 187 is configured to maximise the range of the vehicle 104, increasing the likelihood of the vehicle 104 reaching its destination. Moreover, the accelerator pedal map 187 could be configured so that the torque delivered over the first part of the accelerator pedal range is delivered at a higher rate when compared to the torque delivered over the second part of the accelerator pedal range. This means that the driver is able to accelerate in city traffic conditions and maintain a high cruising speed, but the vehicle 104 will have a lower acceleration in the second part of the accelerator pedal range.

The controller may be configured to selectively inhibit or modify the application of acceleration or deceleration pedal maps in dependence on the surface over which the vehicle is travelling.

The controller may be configured to selectively inhibit or modify the application of acceleration or deceleration pedal maps in dependence on a received or determined terrain mode, or a terrain type received from a further vehicle system or controller.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Figure 17:
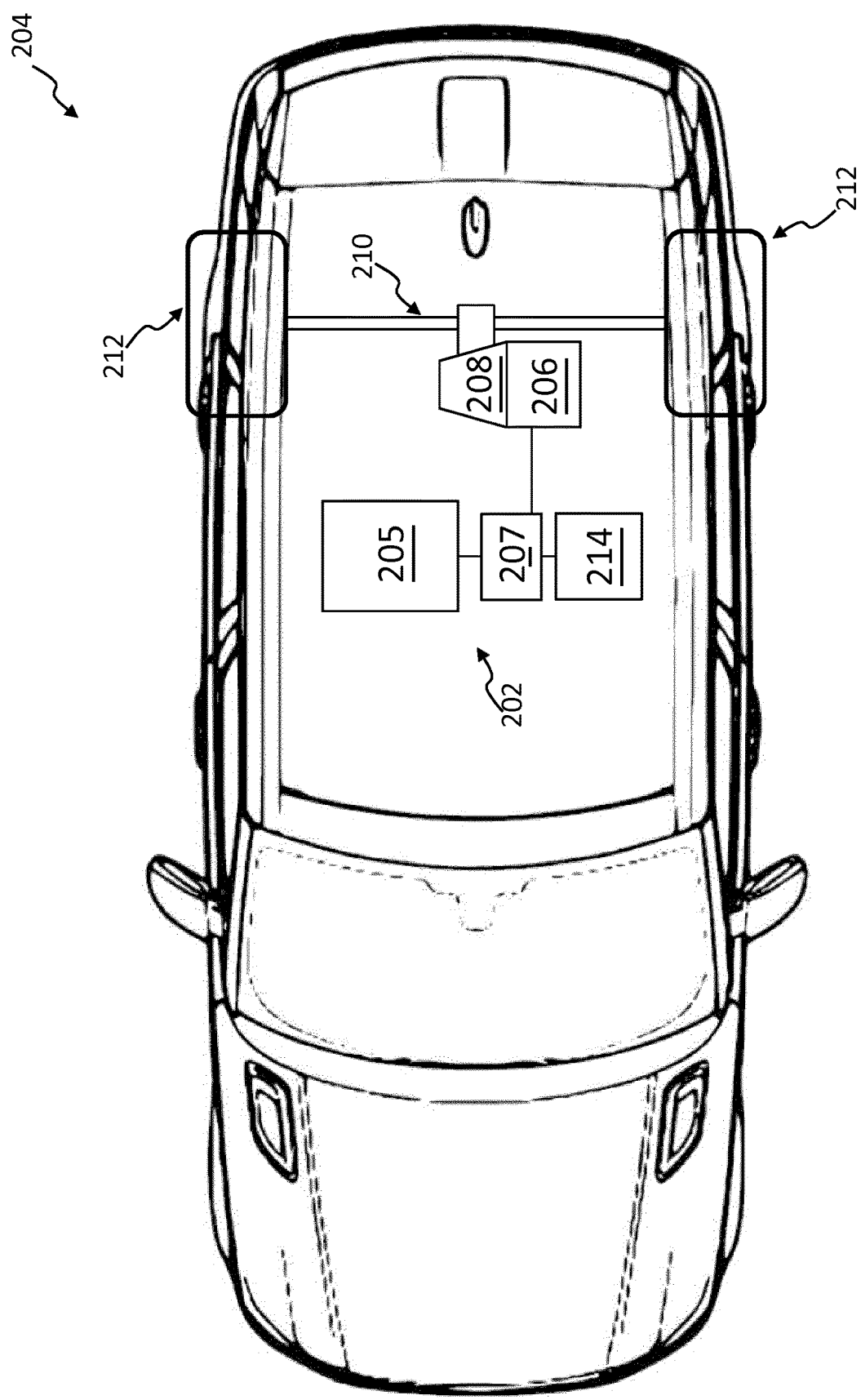
FIG. 17 shows a schematic representation of a powertrain for use with an embodiment of this invention.

With reference to FIG. 17, a powertrain, designated generally as 202, of an electric vehicle 204 is shown in plan view. The powertrain 202 comprises an energy storage means, in the form of a battery 205, operatively connected via an inverter 207 to an electric motor 206, which generates torque, and a drive transmission 208. The drive transmission 208 could take the form of a differential. The torque is transferred through a driveline 210 to wheels 212 that generate a tractive force to move the vehicle 204. A controller 214 is operatively connected to the electric motor 206 by the inverter 207, and functions to control the generation of torque by converting an accelerator pedal position to a torque output using an accelerator pedal map. Although FIG. 17 only shows one motor 206 driving the wheels of a rear axle, it will apparent that the vehicle 204 may be arranged so that it has one motor driving the wheels of a front axle, or may have at least one additional motor to drive the wheels of both the front a and rear axles, or additional motors to drive individual wheels.

Figure 18:
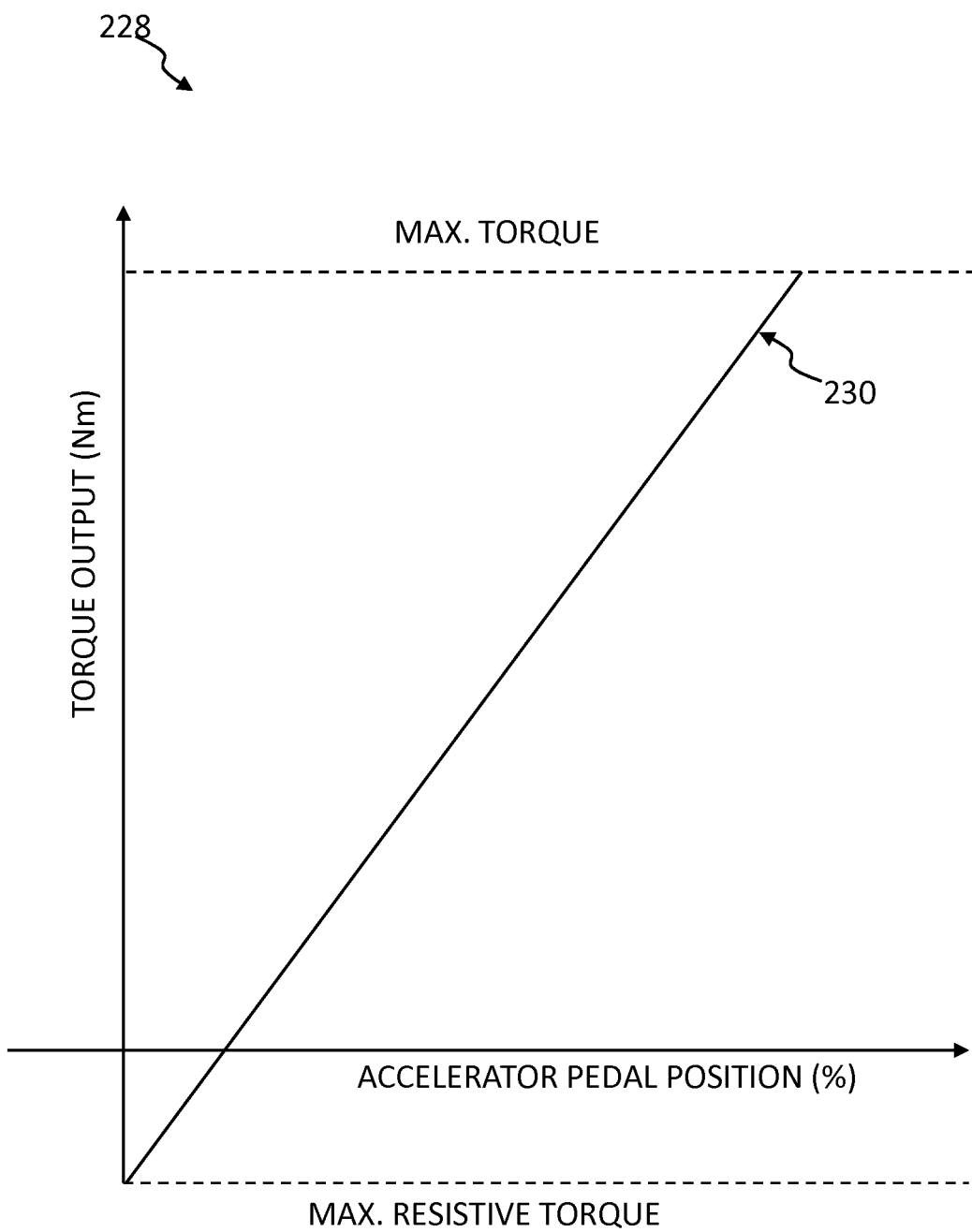
FIG. 18 shows a graph illustrating the torque output produced in response to an accelerator pedal position at road load conditions.

FIG. 18 shows a graph 228, in the form of an accelerator pedal map, relating the torque requested from the electric motor 206 to the travel of the accelerator pedal. The skilled reader will understand that this is a simplified section through a map that may also incorporates vehicle speed or actuator speed. A full map would consist of a torque surface in the Z axis based on the accelerator pedal position in one axis and the motor speed or vehicle speed in another axis. The required torque is the output. Line 230 shows the road load plotted against the position of the accelerator pedal. For clarity, the term "road load" refers to the torque that opposes the movement of the vehicle 204 or, in other words, the torque necessary for maintaining the speed of the vehicle 204. Line 230 shows that the torque increases with respect to the accelerator pedal position to a maximum torque output relating to the maximum torque deliverable by the powertrain 202 when the accelerator pedal is fully pressed. Conversely, the torque output decreases with respect to pedal position to a minimum when the accelerator pedal is fully released, which relates to the maximum resistive torque or overrun torque requested from the electric motor 206 by a powertrain control unit 226. The relationship between the road load and the accelerator pedal position can be characterised generally as being constantly proportional. However, such a relationship cannot deliver a driving experience comparable to what the driver would expect from driving a vehicle comprising an ICE. To this end, the controller 214 functions to provide an intuitive driving experience.

Figure 19:
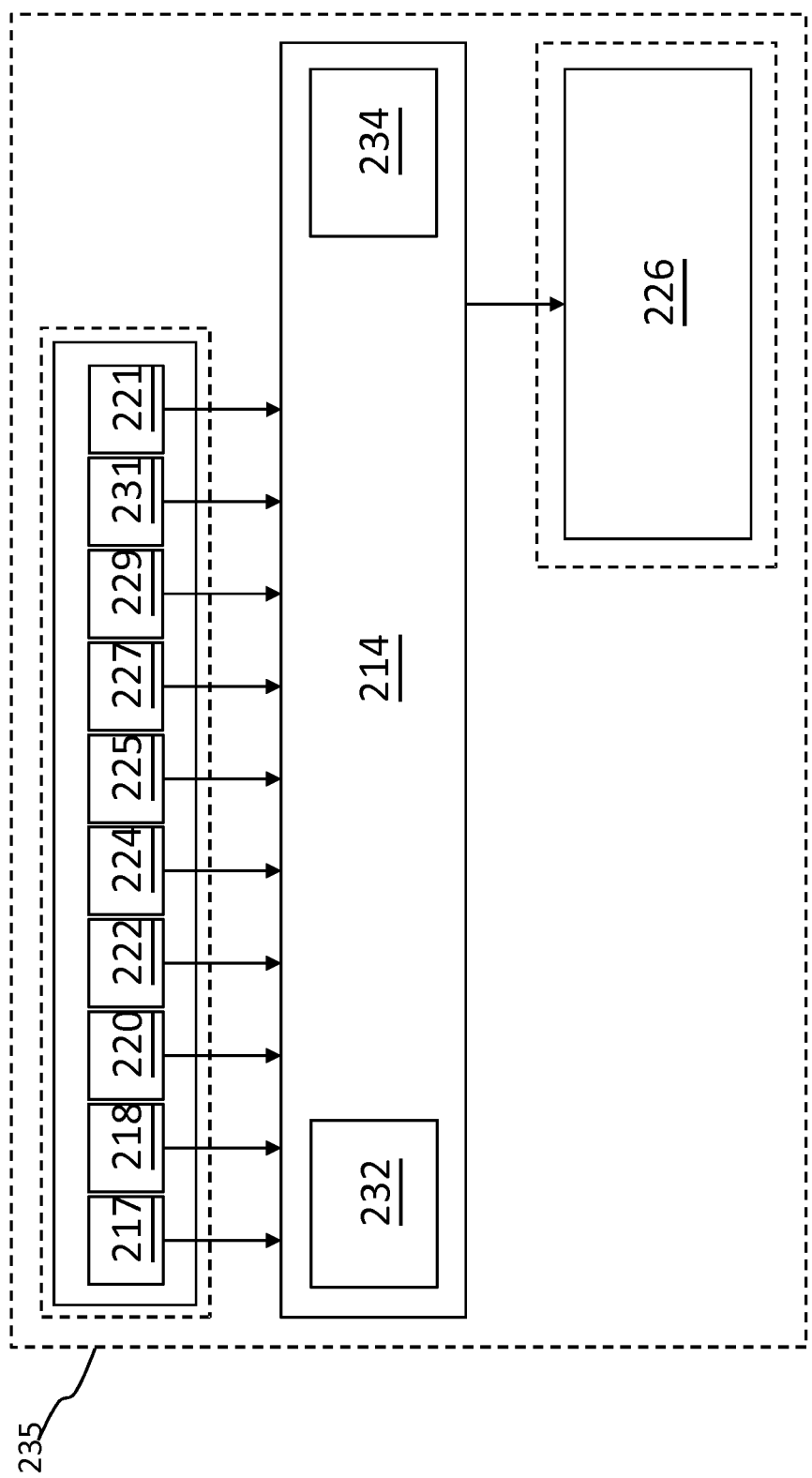
FIG. 19 shows a schematic representation of a controller according to an embodiment of this invention.

With reference to FIG. 19, in accordance with embodiments of the invention, the controller 214 is operable to receive input data regarding the operation of the vehicle 204 and to issue a torque request to the powertrain control unit 226 to achieve a control objective, such as an acceleration demand from the driver of the vehicle 204. The input data comprises a plurality of electrical signals relating to: the accelerator pedal position 217; the vehicle speed 218; the vehicle longitudinal inclination 220; a terrain response mode 222; the current torque 224 being delivered by the electric motor 206; the road load 225; optionally, the road load accelerator pedal position 227; the maximum torque 229 deliverable by the powertrain 202; the overrun torque 231 requested by the powertrain control unit 226; and, the state of charge 221 of the battery 205. In this instance, the vehicle longitudinal inclination 220 relates to the gradient of the surface the vehicle 204 is traversing. These electrical signals, together with the controller 214 and the powertrain control unit 226 form part of a control system 235. The controller 214 comprises a processor 232 configured to convert an accelerator pedal position to a torque output based on one or more accelerator pedal maps, which can be stored in and read from a memory module 234. Alternatively, the controller may be configured to determine the one or more accelerator pedal maps. The skilled reader will appreciate that FIG. 19 is provided only to illustrate an example of a controller 214 architecture in which the invention may be implemented.

Figure 20:
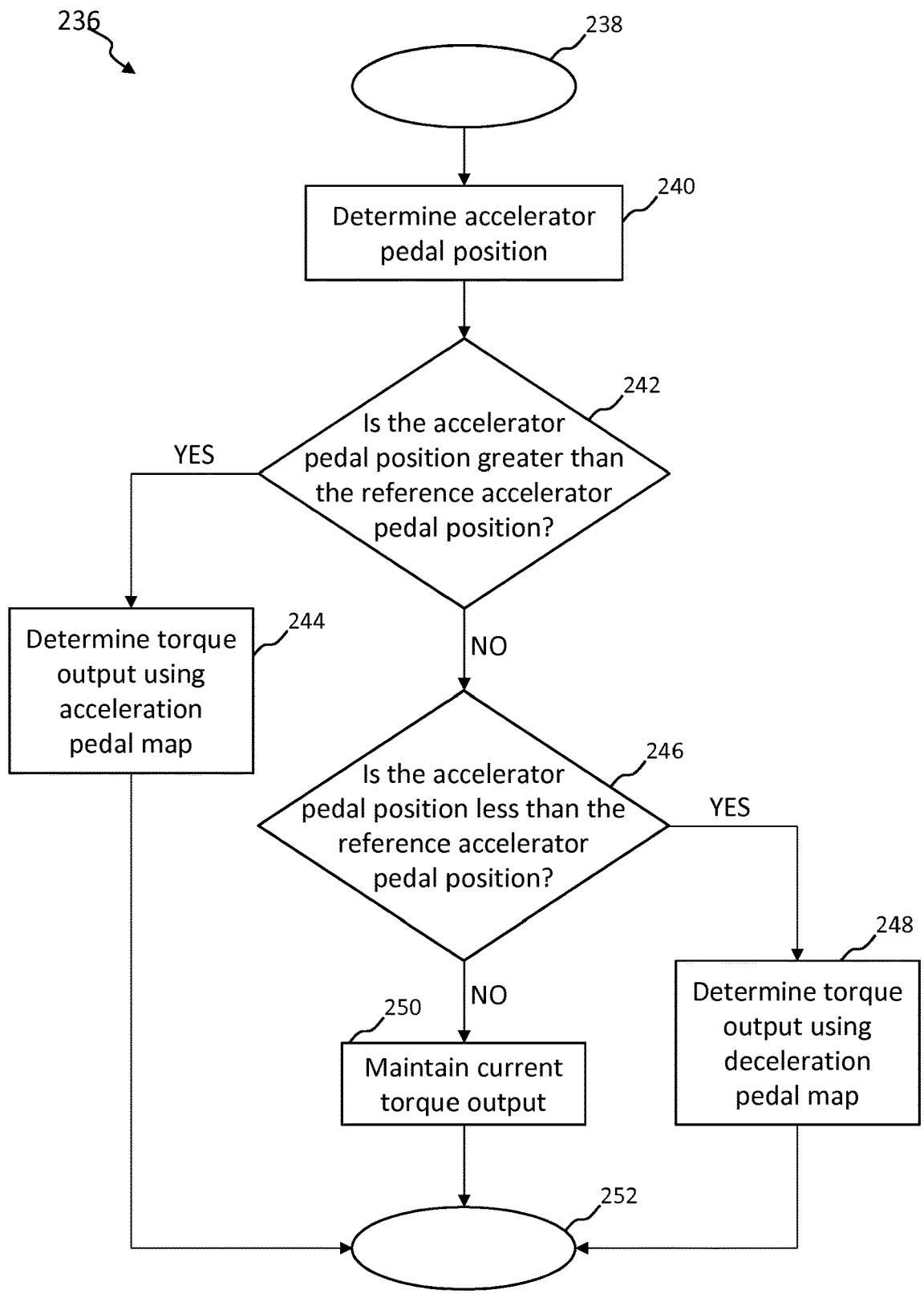
FIG. 20 shows a block diagram summarizing an example of a control method designed according to an embodiment of this invention.

With reference to FIG. 20, in accordance with an embodiment of the invention, the controller 214 incorporates software to implement the process 236 shown in the block diagram. The process 236 initiates at step 238, which may be when the vehicle 204 is operating under road load conditions. At step 240, the current position of the accelerator pedal is determined. The position of the accelerator pedal is then compared, at step 242, against a reference accelerator pedal position to determine if it is greater than the reference accelerator pedal position. The reference accelerator pedal position relates to the road load accelerator pedal position 227. If it is determined that the accelerator pedal position is greater than the reference accelerator pedal position, the process 236 progresses to step 244 where a torque output is determined using an acceleration pedal 254 map before the process 236 terminates at step 252. However, if at step 242 it is determined that the accelerator pedal position is not greater than the reference accelerator pedal position, the process 236 progresses to step 246 where it is determined if the accelerator pedal position equals or is less than the reference accelerator pedal position. If the accelerator pedal position equals the reference accelerator pedal position, the process 236 progresses to step 250 where the current torque output is maintained before the process 236 terminates at step 252. However, if it is determined, at step 246, that the accelerator pedal position is less than the reference accelerator pedal position, the process 236 progresses to step 248 where a torque output is determined using a deceleration pedal map 256 before the process 236 terminates at step 252. It is envisaged that the process 236 could repeat continually.

Figure 21:
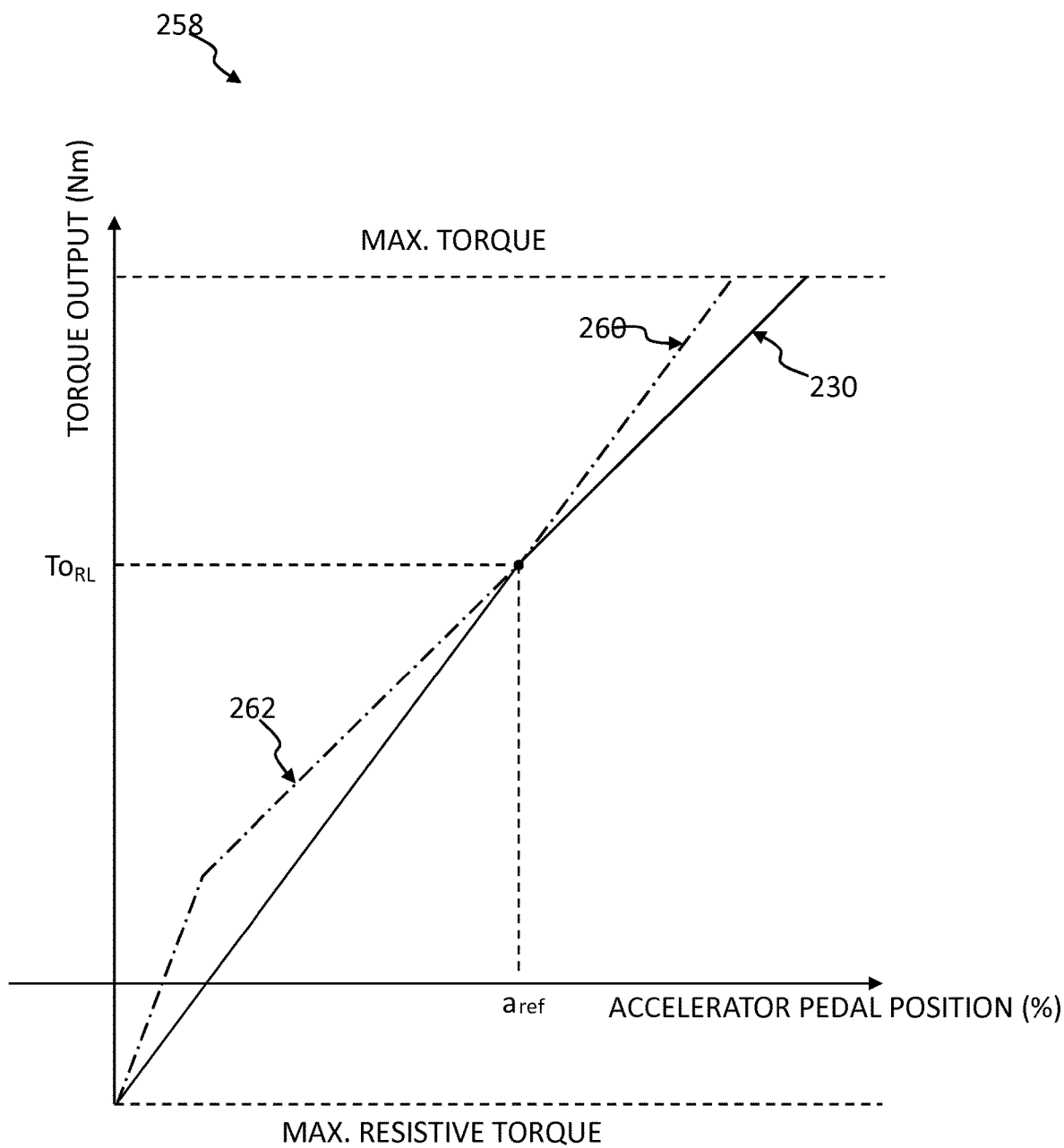
FIG. 21 shows a graph illustrating the torque output produced in response to an accelerator pedal position according to the control method of FIG. 4.

FIG. 21 shows a graph 258, in the form of an accelerator pedal map, illustrating the operation carried out by the process 236. The relationship between the road load and the accelerator pedal position is shown by line 230. The controller 214 is configured to receive a road load signal 225, indicative of the road load, and determine a road load accelerator pedal position signal 227. The road load accelerator pedal position signal 227 is indicative of the reference accelerator pedal position. In this example, the reference accelerator pedal position is the road load accelerator pedal position, but for some implementations or circumstances, it may be desirable to determine the reference accelerator pedal position on the basis of other factors in addition to the road load accelerator pedal position. The controller 214 is further configured to receive an accelerator pedal position signal 217, which indicates the current accelerator pedal position, and compare the reference accelerator pedal position signal 227 and the accelerator pedal position signal 217 to determine the position of the accelerator pedal with respect to the reference accelerator pedal position. If the accelerator pedal position is greater than the reference accelerator pedal position, the controller 214 determines that an acceleration demand has been requested by the driver of the vehicle 204. In this case, a torque output is determined using an acceleration pedal map 260. On the other hand, if the accelerator pedal position is less than the reference accelerator pedal position, the controller 214 decides that a deceleration demand has been requested and determines a torque output using a deceleration pedal map 262. The lower and upper limits of the acceleration pedal map 260 are set by the road load and the maximum torque deliverable by the powertrain 202, respectively. Whereas, the lower and upper limits of the deceleration pedal map 262 are set by the maximum resistive torque and the road load, respectively. The acceleration and deceleration pedal maps 260, 262 are customisable to provide an intuitive driving experience more akin to driving a vehicle comprising an ICE. For example, the acceleration and deceleration pedal maps 260, 262 could be customised according to the speed of the vehicle 204.

In an embodiment of the invention, the acceleration pedal map 260 comprises a low-speed acceleration pedal map and a high-speed acceleration pedal map. Similarly, the deceleration pedal map 262 comprises a low-speed deceleration pedal map and a high-speed deceleration pedal map. The controller 214 is configured to receive a vehicle speed signal 218, indicative of the speed of the vehicle 204, and determine a torque output in dependence on the vehicle speed signal 218. If the accelerator pedal position is greater than the reference accelerator pedal position and it is determined that the speed of the vehicle 204 is below a predetermined threshold speed the controller 214 determines a torque output using the low-speed acceleration pedal map. However, if the accelerator pedal position is greater than the reference accelerator pedal position and the speed of the vehicle 204 is greater than the predetermined threshold speed, the controller 214 determines a torque output using the high-speed acceleration pedal map. Similarly, if the accelerator pedal position is less than the reference accelerator pedal position and the speed of the vehicle 204 is below the predetermined threshold speed, the controller 214 determines a torque output using the low-speed deceleration pedal map. Moreover, if the accelerator pedal position is less than the reference accelerator pedal position and the speed of the vehicle 204 is greater than the predetermined threshold speed, the controller 214 determines a torque output using the high-speed deceleration pedal map.

Alternatively, selection of the low-speed and high-speed acceleration and deceleration pedal maps may be dependent on the vehicle speed relative to different speed limits. If the accelerator pedal position is greater than the reference accelerator pedal position and it is determined that the speed of the vehicle 204 equals or is below a predetermined low-speed limit, the controller 214 determines a torque output using the low-speed acceleration pedal map. However, if the accelerator pedal position is greater than the reference accelerator pedal position and the speed of the vehicle 204 equals or is greater than a predetermined high-speed limit, the controller 214 determines a torque output using the high-speed acceleration pedal map. Similarly, if the accelerator pedal position is less than the reference accelerator pedal position and the speed of the vehicle 204 equals or is below a predetermined low-speed limit, the controller 214 determines a torque output using the low-speed deceleration pedal map. Moreover, if the accelerator pedal position is less than the reference accelerator pedal position and the speed of the vehicle 204 equals or is greater than a predetermined high-speed limit, the controller 214 determines a torque output using the high-speed deceleration pedal map. The controller 214 is further configured to determine a torque output based a combination of the low-speed and high-speed acceleration pedal maps if the accelerator pedal position is greater than the reference accelerator pedal position, but the speed of the vehicle 204 is between the low-speed and high-speed limits. Likewise, a torque output is determined based a combination of the low-speed and high-speed deceleration pedal maps when the accelerator pedal position is less than the reference accelerator pedal position, but the speed of the vehicle 204 is between the low-speed and high-speed limits. Combining pedal maps may be done by interpolating between the low-speed and high-speed pedal maps in dependence on the vehicle speed.

In a further embodiment of the invention, the controller 214 may also be configured to modify the acceleration and deceleration pedal maps, or the low-speed and high-speed versions thereof, using a gradient modifier to take into account a gradient of the surface the vehicle 204 is traversing. The controller 214 determines the gradient modifier in dependence on the vehicle longitudinal inclination or gradient signal 220.

Figure 22:
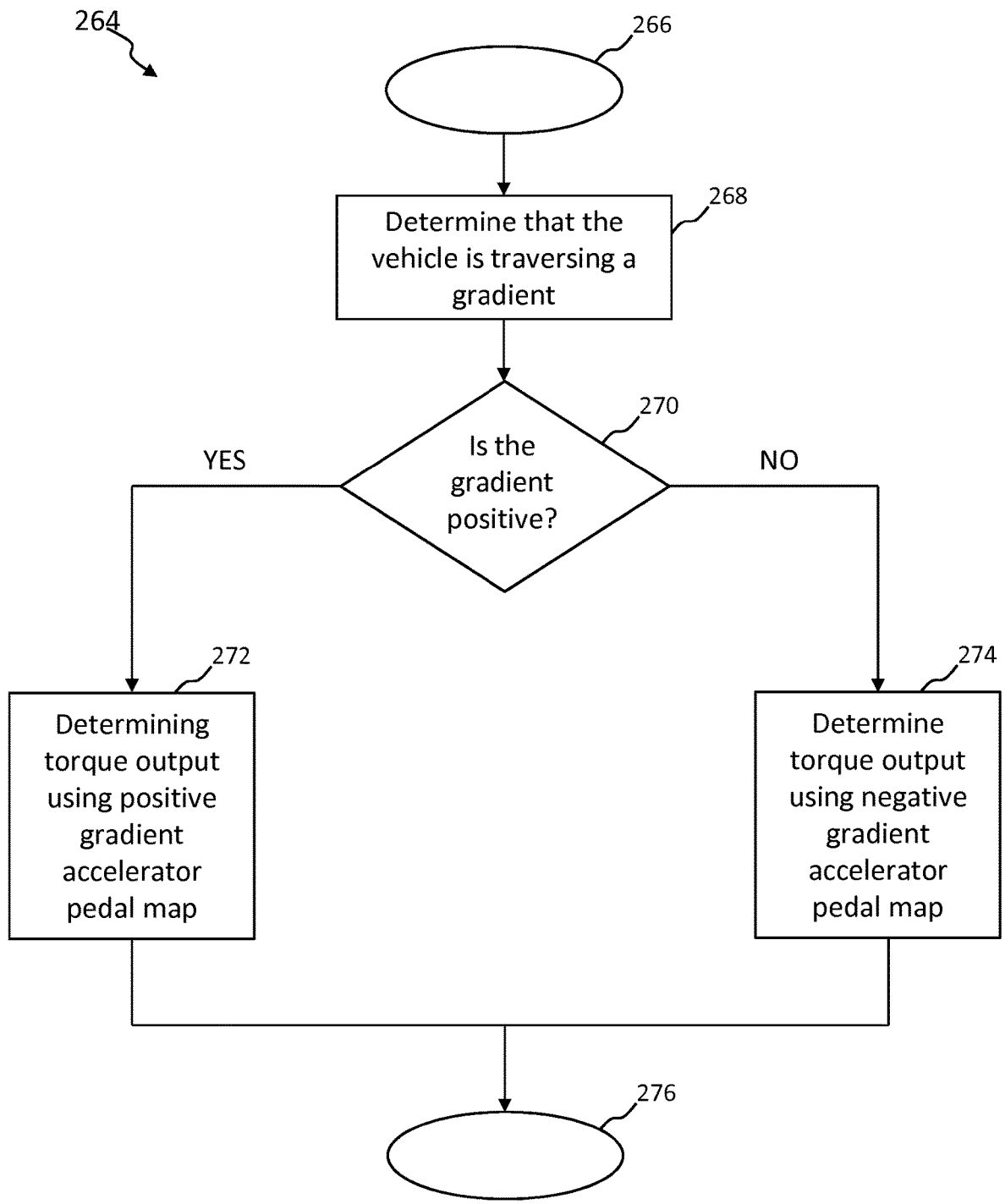
FIG. 22 shows a block diagram summarizing an example of a control method designed according to an embodiment of this invention.

With reference to FIG. 22, in accordance with an embodiment of the invention, the controller 214 incorporates software to implement the process 264 shown in the block diagram. The process 264 initiates at step 266 and progresses to step 268, where it is determined whether the vehicle 204 is traversing a gradient. This can be done using the vehicle longitudinal inclination or gradient signal 220. If it is determined that the vehicle 204 is traversing a gradient, the process 264 moves to step 270 where it is determined whether the gradient is a positive gradient or a negative gradient. If, at step 270, it is determined that the vehicle 4 is traversing a positive gradient, the process 264 moves to step 272 and a torque output is determined using a positive gradient pedal map. However, if, at step 270, it is determined that the vehicle 204 is traversing a negative gradient, the process 264 moves to step 274 and a torque output is determined using a negative gradient pedal map. Following steps 272, 274, the process 264 terminates at step 276. Basing the torque output on accelerator pedal maps that have been modified to account for the gradient of the surface the vehicle 204 is traversing prevents the perceived performance reduction that occurs in electric vehicles, which do not have a traditional gearbox, and offers the opportunity to enhance an electrified powertrain capability feel over a conventional one.

Figure 23:
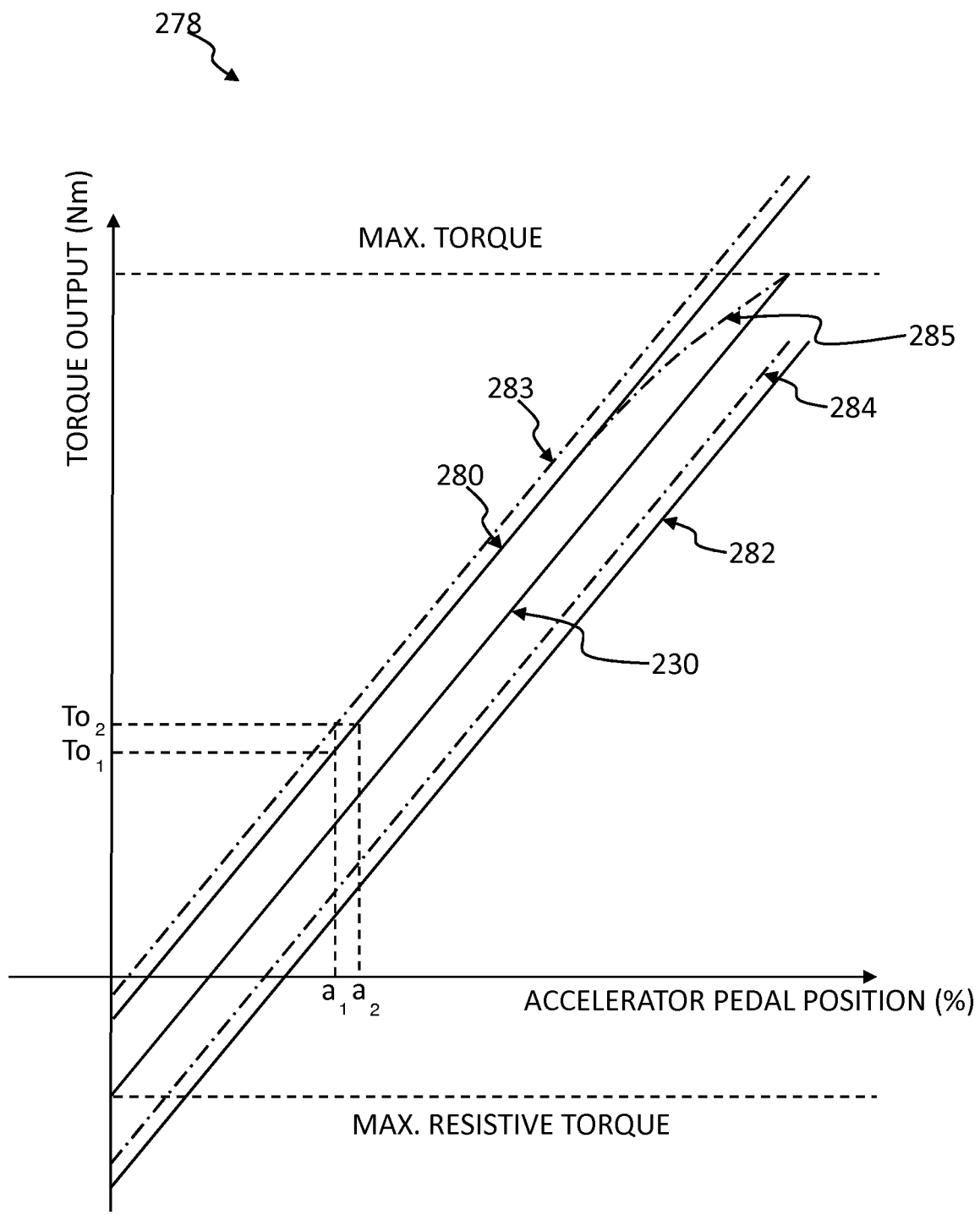
FIG. 23 shows a graph illustrating the torque output produced in response to an accelerator pedal position according to the control method of FIG. 6; and, FIG. 24 shows a graph illustrating the torque output produced in response to an accelerator pedal position according to a control method designed according to an embodiment of this invention.

FIG. 23 shows a graph 278 illustrating the operation carried out by the process 264. The graph 278 comprises three accelerator pedal maps. Line 230 shows an accelerator pedal map under road load conditions, and lines 280, 282 are the positive gradient and the negative gradient accelerator pedal maps respectively. That is, lines 280, 282 are accelerator pedal maps that have been altered to account for a positive gradient and a negative gradient respectively. The degree to which lines 280, 282 are altered may also be influenced by the terrain response mode selected by the driver of the vehicle 204, in addition to gradient. The controller 214 is configured to determine the selected terrain response mode using the terrain response mode signal 222. It can be seen from line 280 that the torque output is greater, for the same accelerator pedal position, when compared to road load conditions. Conversely, line 282 shows that the torque output is less when compared to road load conditions for the same accelerator pedal position.

The graph 278 comprises two additional accelerator pedal maps, lines 283, 284. These lines 283, 284 represent the torque output necessary for maintaining the speed of the vehicle 204 when going from road load conditions to traversing a positive gradient or a negative gradient respectively. Lines 283, 284 have been altered to account for the same gradients as lines 280, 282. When the vehicle 204 is traversing a positive gradient, the controller 214 functions to determine torque output using the positive gradient accelerator pedal map, line 280. It can be seen from comparing lines 280, 283 that, for the same accelerator pedal position, the torque output from the positive gradient accelerator pedal map, line 280, is less than the torque necessary for maintaining the speed of the vehicle 204 while traversing the positive gradient. That is, the positive gradient accelerator pedal map, line 280, used by the controller 214 purposively under compensates for the positive gradient. In order to maintain the speed of the vehicle 204, the driver of the vehicle 204 is required to press the accelerator pedal to position to achieve the required torque output. This situation is constructed by the controller 214 in order to provide an intuitive driving experience in which the driver would expect to have to press the accelerator pedal to some extent when traversing a positive gradient based on their experience of driving a vehicle comprising an ICE.

Similarly, the driver would expect to have to lift-off or release the accelerator pedal when going downhill. In view of that, the negative gradient accelerator pedal map, line 282, used by the controller 214 purposively over compensates for the negative gradient, and so the driver of the vehicle 204 is required to release the accelerator pedal in order to maintain the speed of the vehicle 204 when traversing a negative gradient.

It can be seen that the upper limit of the positive gradient accelerator pedal map, line 280, is offset from the road load accelerator pedal map, line 230, such that it exceeds the maximum torque deliverable by the powertrain 202. This is done in order to prevent the effect of the gradient modification from dissipating, as indicated by line 285, as the torque demand increases away from the road load and towards the maximum torque deliverable by the powertrain 202, which would be counter-intuitive for the driver of the vehicle 204.

In some circumstances, particularly in off-highway or off-road terrain, it may be undesirable to modify the pedal response in this way, for example when traversing some terrain types where consistent control of the vehicle torque irrespective of the gradient is desirable. The controller may be configured to inhibit the positive gradient pedal map and/or the negative gradient pedal map in dependence on a terrain mode of the vehicle. The terrain mode may be selected by a driver of the vehicle, or determined automatically by a control system of the vehicle. For example, the controller may be configured to inhibit the positive gradient pedal map and/or the negative gradient pedal map the terrain mode of the vehicle is a sand mode or a rock mode.

In a further embodiment of the invention, the controller 214 may determine an accelerator pedal map on receiving the state of charge signal 221, which indicates that the state of charge of the battery 205 is below a predetermined threshold, and determine a torque output in dependence on the accelerator pedal map.

Figure 24:
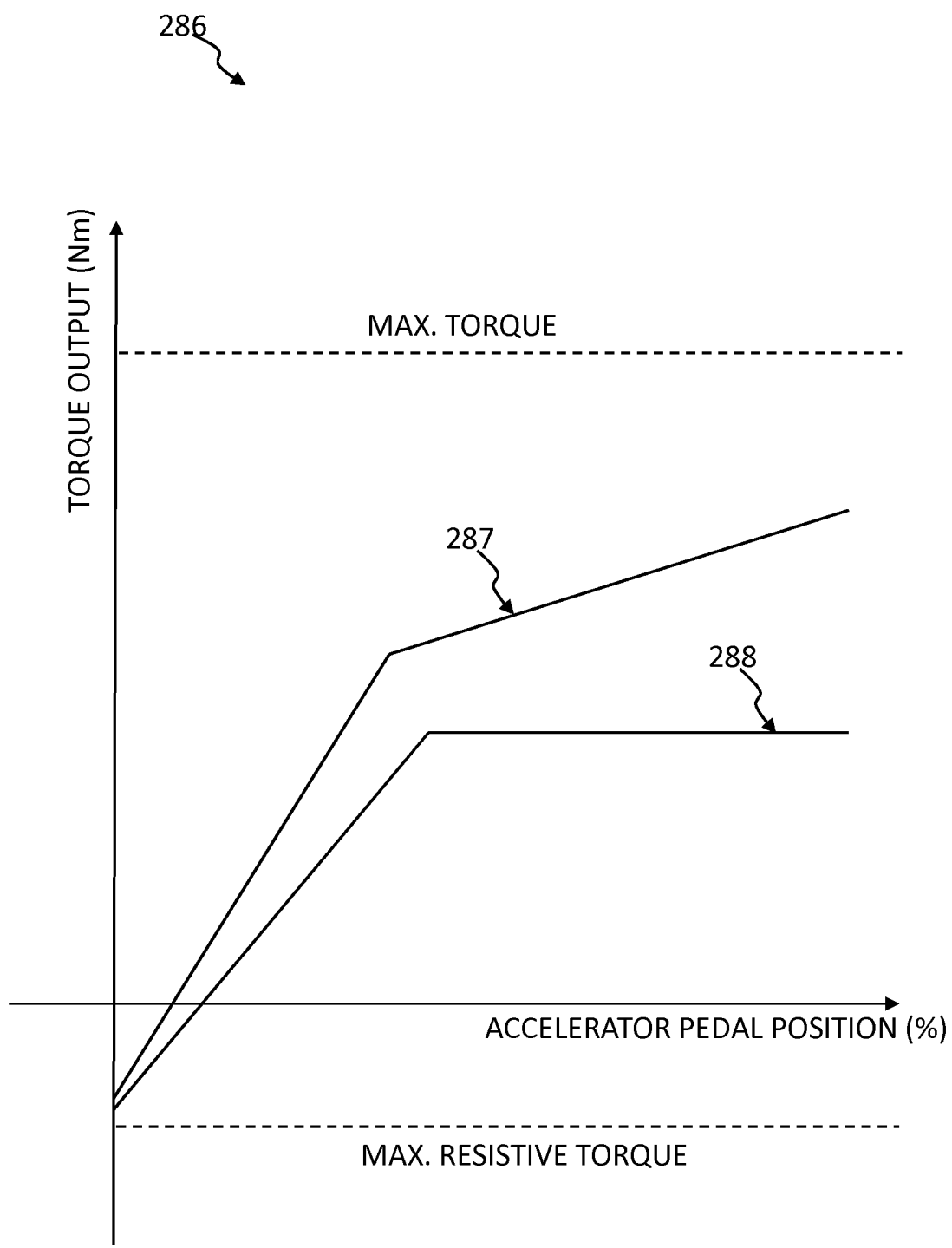

FIG. 24 shows a graph 286 including an accelerator pedal map 287 in accordance with this embodiment of the invention. The graph 286 includes an additional accelerator pedal map 288. The additional accelerator pedal map 288 is an example of how known accelerator pedal maps are modified when the state of charge of an energy storage means on an electric vehicle falls below a threshold. In this example, it can be seen that the accelerator pedal map 288 initially increases with the accelerator pedal position, after which a torque limit is applied and the torque output remains constant as the accelerator pedal position increases. However, rather than applying a torque limit, the accelerator pedal map 287 is configured to deliver increasing amounts of torque with respect to pedal position up to a maximum which is less that the maximum torque deliverable by the powertrain 202. Although this results in an overall lower output torque, the behaviour of the vehicle 204 is made to be more intuitive for the driver when compared to simply applying a torque limit. In embodiments of the invention, the accelerator pedal map 287 is configured to maximise the range of the vehicle 204, increasing the likelihood of the vehicle 204 reaching its destination. Moreover, the accelerator pedal map 287 could be configured so that the torque delivered over the first part of the accelerator pedal range is delivered at a higher rate when compared to the torque delivered over the second part of the accelerator pedal range. This means that the driver is able to accelerate in city traffic conditions and maintain a high cruising speed, but the vehicle 204 will have a lower acceleration in the second part of the accelerator pedal range.

The controller may be configured to selectively inhibit or modify the application of acceleration or deceleration pedal maps in dependence on the surface over which the vehicle is travelling.

The controller may be configured to selectively inhibit or modify the application of acceleration or deceleration pedal maps in dependence on a received or determined terrain mode, or a terrain type received from a further vehicle system or controller.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Many modifications may be made to the above examples without departing from the scope of the present invention as defined in the accompanying claims.

The invention claimed is:

1. A controller for a vehicle, the controller being configured to:
   receive a road load signal indicative of a torque output for maintaining a current speed of the vehicle, wherein the road load signal is a function of the current speed of the vehicle and a terrain response mode of the vehicle;
   determine a road load accelerator pedal position signal based at least in part on the road load signal, the road load accelerator pedal position signal being indicative of a reference accelerator pedal position;
   receive an accelerator pedal position signal indicative of a current position of the accelerator pedal;
   compare the reference accelerator pedal position signal with the accelerator pedal position signal to determine a position of the accelerator pedal with respect to the reference accelerator pedal position;
   determine a torque output based at least in part on an acceleration pedal map if the position of the accelerator pedal is greater than the reference accelerator pedal position;
   determine a torque output based at least in part on a deceleration pedal map if the position of the accelerator pedal is less than the reference accelerator pedal position; and
   control an electric motor of the vehicle based on the determined torque output.

2. The controller according to claim 1, the controller being further configured to:
   receive a maximum torque signal indicative of a maximum torque deliverable by a powertrain of the vehicle; and determine the acceleration pedal map based at least in part on the road load signal and the maximum torque signal.

3. The controller according to claim 2, wherein the maximum torque signal is a function of at least one selected from the group consisting of:
   a speed of the vehicle, a gradient of the surface the vehicle is traversing, a terrain response mode, and a torque requested from the powertrain of the vehicle.

4. The controller according to claim 1, the controller being further configured to:
   receive an overrun torque demand signal indicative of a level of overrun torque requested by a vehicle system;

and determine the deceleration pedal map based at least in part on the road load signal and the overrun torque demand signal.

5. The controller according to claim 4, wherein the overrun torque demand signal is a function of at least one selected from the group consisting of:
a speed of the vehicle, a gradient of the surface the vehicle is traversing, a terrain response mode, and a torque requested from the powertrain of the vehicle.

6. The controller according to claim 1, wherein the acceleration pedal map comprises a low-speed acceleration pedal map and a high-speed acceleration pedal map.

7. The controller according to claim 6, the controller being further configured to:
receive a vehicle speed signal indicative of a speed of the vehicle;
determine a torque output according to the low-speed acceleration pedal map if the position of the accelerator pedal is greater than the reference accelerator pedal position (aref) and the vehicle speed equals or is less than a low-speed limit; and
determine a torque output according to the high-speed acceleration pedal map if the position of the accelerator pedal is greater than the reference accelerator pedal position (aref) and the vehicle speed equals or is greater than a high-speed limit.

8. The controller according to claim 1, wherein the deceleration pedal map comprises a low-speed deceleration pedal map and a high-speed deceleration pedal map.

9. A control system for a vehicle, the control system comprising the controller according to claim 1.

10. A vehicle comprising the control system according to claim 9.

11. A method of controlling a vehicle, the method comprising:
receiving a road load signal indicative of a torque output for maintaining a current speed of the vehicle, wherein the road load signal is a function of the current speed of the vehicle and a terrain response mode of the vehicle;
determining a road load accelerator pedal position signal based at least in part on the road load signal, the road load accelerator pedal position signal being indicative of a reference accelerator pedal position;
receiving an accelerator pedal position signal indicative of a current position of the accelerator pedal;
comparing the reference accelerator pedal position signal with the accelerator pedal position signal to determine a position of the accelerator pedal with respect to a reference accelerator pedal position;
determining a torque output based at least in part on an acceleration pedal map if the position of the accelerator pedal is greater than the reference accelerator pedal position;
determining a torque output based at least in part on a deceleration pedal map if the position of the accelerator pedal is less than the reference accelerator pedal position; and
controlling an electric motor of the vehicle based on the determined torque output.

12. A non-transitory, computer-readable storage medium storing instructions thereon that, when executed by one or more electronic processors, causes the one or more electronic processors to carry out the method of claim 11.

* * * * *